(12) United States Patent
Yamaoka et al.

(10) Patent No.: US 12,728,543 B2
(45) Date of Patent: Sep. 8, 2026

(54) CONTROL DEVICE AND MACHINE SYSTEM

(71) Applicant: FANUC CORPORATION, Yamanashi (JP)

(72) Inventors: Nobuaki Yamaoka, Yamanashi (JP); Takashi Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 76 days.

(21) Appl. No.: 18/719,397

(22) PCT Filed: Dec. 21, 2021

(86) PCT No.: PCT/JP2021/047415
§ 371 (c)(1),
(2) Date: Jun. 13, 2024

(87) PCT Pub. No.: WO2023/119449
PCT Pub. Date: Jun. 29, 2023

(65) Prior Publication Data

US 2025/0058478 A1 Feb. 20, 2025

(51) Int. Cl.
*B25J 13/08* (2006.01)
*B25J 19/02* (2006.01)

(52) U.S. Cl.
CPC ........... *B25J 13/085* (2013.01); *B25J 19/021* (2013.01)

(58) Field of Classification Search
CPC ......... B25J 13/085; B25J 19/021; B25J 13/08
USPC .......................................................... 700/245
See application file for complete search history.

(56) References Cited

U.S. PATENT DOCUMENTS 11,358,276 B2 * 6/2022 Nakayama ............. B25J 13/085
12,515,343 B2 * 1/2026 Koga ..................... B25J 9/1697
2005/0159840 A1 * 7/2005 Lin .................... G05B 19/4163 700/245
2014/0025205 A1 * 1/2014 Inazumi ................. B25J 9/1694 700/258
2014/0230581 A1 * 8/2014 Nakatani ................ B25J 13/085 73/865
2015/0005923 A1 * 1/2015 Gu ...................... B24B 27/0038 901/41
2015/0292851 A1 * 10/2015 Yamamoto ............... G01B 5/20 33/503
2017/0113346 A1 * 4/2017 Nagata .................. B25J 9/1633
(Continued)

FOREIGN PATENT DOCUMENTS

EP 3162516 B1 * 4/2019 ............ B25J 13/085
JP S62237335 A 10/1987
(Continued)

OTHER PUBLICATIONS

JP2012040634.translate; Calibration Device and Method for Power-Controlled Robot; IHI Corp. (Year: 2012).*
(Continued)

*Primary Examiner* — B M M Hannan
(74) *Attorney, Agent, or Firm* — BUCHANAN INGERSOLL & ROONEY PC

(57) ABSTRACT

A controller includes a control unit which performs mass measurement or force control using a torque sensor that detects a torque acting on a link in a machine. A torque sensor adjustment unit of the controller performs adjustment of the torque sensor using an external instrument.

8 Claims, 14 Drawing Sheets

(56) References Cited

U.S. PATENT DOCUMENTS

| | | | | |
|---|---|---|---|---|
| 2017/0266811 | A1 | 9/2017 | Ogawara | |
| 2018/0169854 | A1* | 6/2018 | Shiratsuchi | B25J 11/0095 |
| 2018/0293768 | A1* | 10/2018 | Ooshima | G06T 19/00 |
| 2020/0070369 | A1* | 3/2020 | Son | B25J 13/085 |
| 2020/0238526 | A1* | 7/2020 | Nammoto | B25J 9/163 |
| 2020/0338729 | A1* | 10/2020 | Nagata | B25J 9/1633 |
| 2020/0398424 | A1* | 12/2020 | Hane | G06N 3/0499 |

FOREIGN PATENT DOCUMENTS

| | | | |
|---|---|---|---|
| JP | 2014058029 | A | 4/2014 |
| JP | 2017164870 | A | 9/2017 |
| WO | 2020017370 | A1 | 1/2020 |

OTHER PUBLICATIONS

International Search Report (PCT/ISA/210) with translation and Written Opinion (PCT/ISA/237) mailed on Mar. 1, 2022, by the Japanese Patent Office as the International Searching Authority for International Application No. PCT/JP2021/047415. (9 pages).

* cited by examiner 1
2
3
4
TEACHING DEVICE
CONTROLLER
10
11
12
13
14
15
16
17
50
J1
J2
J3
J4
J5
J6
C1
C2
C3
W1
W2
P 1
2
3
4
TEACHING DEVICE
CONTROLLER
10
11
12
13
14
15
16
17
50
J1
J2
J3
J4
J5
J6
C1
C2
C3
P
W1

Fig. 3A

TEACHING DEVICE

CONTROLLER

Fig. 4A

TEACHING DEVICE

CONTROLLER

TEACHING DEVICE
CONTROLLER
1
2
3
4
10
11
12
13
14
15
16
17
50
J1
J2
J3
J4
J5
J6
C1
C2
C3
P
W1

TEACHING DEVICE
CONTROLLER
1
2
3
4
10
11
12
13
14
15
16
17
J1
J2
J3
J4
J5
J6
C1
C2
C3
P
W1
52

Figure 7:
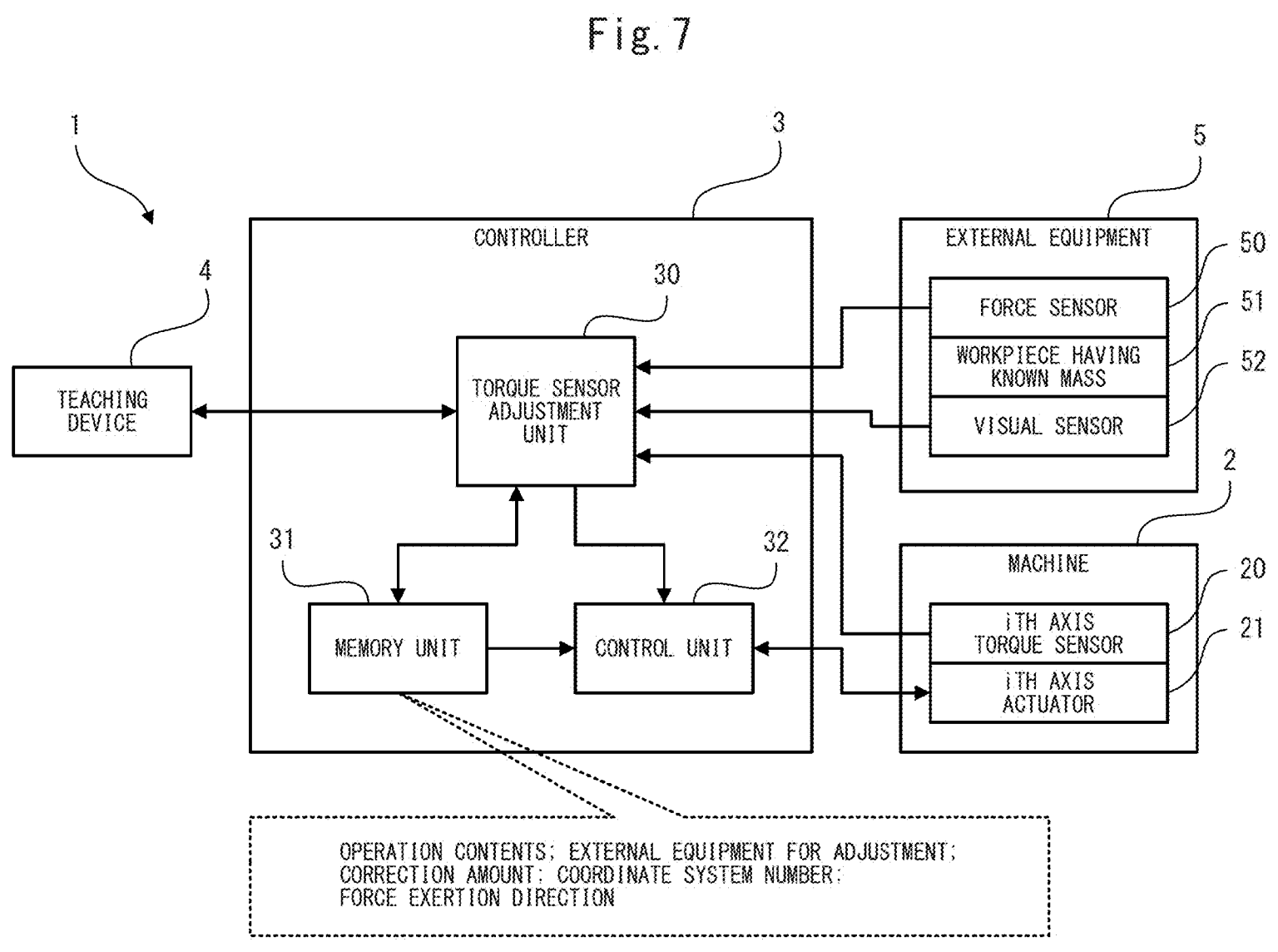

5 EXTERNAL EQUIPMENT
50 FORCE SENSOR
51 WORKPIECE HAVING KNOWN MASS
52 VISUAL SENSOR

2 MACHINE
20 iTH AXIS TORQUE SENSOR
21 iTH AXIS ACTUATOR

3 CONTROLLER
30 TORQUE SENSOR ADJUSTMENT UNIT
31 MEMORY UNIT
32 CONTROL UNIT

4 TEACHING DEVICE

OPERATION CONTENTS; EXTERNAL EQUIPMENT FOR ADJUSTMENT;
CORRECTION AMOUNT; COORDINATE SYSTEM NUMBER;
FORCE EXERTION DIRECTION 60
4
1
SERVER DEVICE
30
TORQUE SENSOR ADJUSTMENT UNIT
TEACHING DEVICE
61
31
COMMUNICATION CONTROL UNIT
MEMORY UNIT
MACHINE NUMBER; OPERATION CONTENTS; EXTERNAL EQUIPMENT FOR ADJUSTMENT; CORRECTION AMOUNT; COORDINATE SYSTEM NUMBER; FORCE EXERTION DIRECTION
3
2
3
2
COMMUNICATION CONTROL UNIT
62
32
CONTROL UNIT
CONTROLLER
COMMUNICATION CONTROL UNIT
62
32
CONTROL UNIT
CONTROLLER

CONTROL DEVICE AND MACHINE SYSTEM

CROSS REFERENCE TO RELATED APPLICATIONS

This is the U.S. National Phase application of PCT/JP2021/047415, filed Dec. 21, 2021 the disclosure of which is incorporated herein by reference in its entirety for all purposes.

FIELD OF THE INVENTION

The present invention relates to a machine control technology, and in particular, relates to a controller and machine system which measure force acting on a control point of a machine.

BACKGROUND OF THE INVENTION

Technologies for performing force control for controlling the force acting on a control point of the machine using a torque sensor which detects the torque acting on a link of a machine such as a robot and mass measurement for measuring the mass of a workpiece held at a control point of a machine are widely known. In order to perform such force control and mass measurement, the force acting on the control point is calculated based on the detected value of the torque sensor and the distance from the torque sensor to the control point of the machine.

When using a torque sensor attached to a link of a machine, the accuracy of the force acting on the control point of the machine tends to be lower than when using a force sensor attached near a control point of machine. The primary reason is that the distance from the torque sensor to the control point is long. The farther the control point from the torque sensor, the greater the force noise will be when converting the detected value of the torque sensor to the force acting on the control point. Furthermore, depending on the rigidity of the mechanical parts of the machine, there is a risk that the force actually generated at the control point and the force obtained from the torque sensor differ. As background technology related to the present application, for example, the literature described below is publicly known.

Patent Literature 1 (Japanese Unexamined Patent Publication (Kokai) No. 62-237335) describes a method and device for automatically detecting a transformation matrix representing the relationship between strain voltage and force (force and torque are collectively referred to as "force") in a force sensor installed between a wrist and hand of a robot. It is described that a workpiece having a known weight and center of gravity is held in the hand, the wrist is pivoted so as to assume different postures, the force is calculated based on the posture and position of the force sensor detected by the encoder at that time, as well as the weight and center of gravity of the workpiece and hand that have been input in advance, the strain voltage detected from the force sensor is acquired, and a transformation matrix between the obtained force and the acquired strain voltage is calculated.

PATENT LITERATURE

[PTL 1] Japanese Unexamined Patent Publication (Kokai) No. 62-237335

SUMMARY OF THE INVENTION

The present invention has been conceived in light of the circumstances described above, and an object thereof is to provide a technology with which force control or mass measurement can be performed with high precision using a torque sensor attached to a link of a machine.

An aspect of the present disclosure provides a controller comprising a control unit which performs force control or mass measurement using a torque sensor for detecting torque acting on a link of a machine, and a torque sensor adjustment unit for performing adjustment of the torque sensor using external equipment or using internal data or external data.

Another aspect of the present disclosure provides a controller comprising a control unit which performs force control or mass measurement unit a torque sensor for detecting a torque acting on a link of a machine, and a torque sensor adjustment unit which sets adjustment of the torque sensor to complete when a predetermined number of repetitions of torque sensor adjustment have been performed or when a result of the adjustment of the torque sensor has converged.

Yet another aspect of the present disclosure provides a machine system comprising a machine comprising a torque sensor for detecting a torque acting on a link, a control unit which performs force control or mass measurement using the torque sensor, and a torque sensor adjustment unit which performs adjustment of the torque sensor using external equipment or using internal data or external data.

According to any aspect of the present disclosure, force control or mass measurement can be performed with high precision using a torque sensor attached to a link of a machine.

BRIEF DESCRIPTION OF DRAWINGS

FIG. 3A is a configuration view of the machine system of a third embodiment.

FIG. 4A is a configuration view of the machine system of a fourth embodiment.

FIG. 7 is a block diagram of a machine system according to an embodiment.

DETAILED DESCRIPTION OF EMBODIMENTS

Figure 1A:
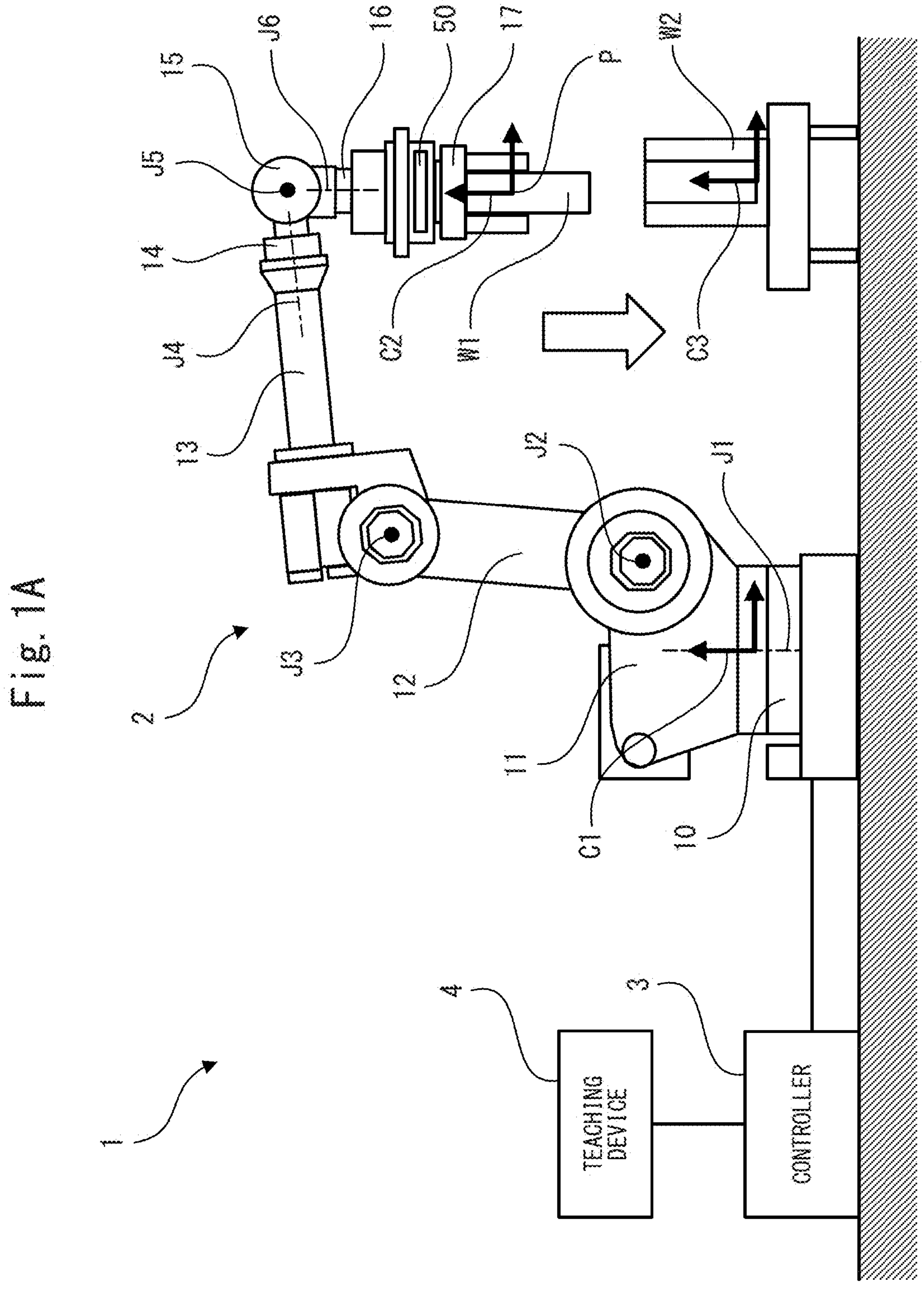
FIG. 1A is a configuration view of a machine system of a first embodiment.

The embodiments of the present disclosure will be described in detail below with reference to the attached drawings. In the drawings, identical or similar constituent elements have been assigned the same or similar reference signs. Furthermore, the embodiments described below do not limit the technical scope of the invention or the meaning of terms described in the claims.

The machine system 1 of a first embodiment will be described. FIG. 1A is a configuration view of the machine system 1 of the first embodiment. The machine system 1 comprises a machine 2 and a controller 3 for controlling the operations of the machine 2. The machine system 1 comprises a teaching device 4 for teaching the operations of the machine 2, though this is not indispensable.

Though the machine 2 is configured as a multi-joint robot, it is not limited to this, and in another embodiment, it may be configured as another industrial robot such as a single-joint robot, a parallel link robot, or a dual-arm robot. Furthermore, in another embodiment, the machine 2 may be configured not as an industrial robot but as another type of robot such as a humanoid. Alternatively, in yet another embodiment, the machine 2 may be not a robot, but may be another industrial machine such as a machine tool, a construction machine, an agricultural machine, or another type of machine such as a vehicle, an aircraft, or a rocket.

The machine 2 comprises one or more interconnected links 10 to 16. Though the links 11 to 16 are configured as pivot links which pivot about predetermined axes, they are not limited to this, and in another embodiment, they may be configured as linear links which move linearly along predetermined axes. The link 10 is, for example, a base which is affixed at a predetermined position, and the link 11 is, for example, a rotating trunk supported so as to be capable of rotating relative to the link 10 about a first axis J1. The link 12 is, for example, an upper arm which is supported so as to be capable of rotating relative to the link 11 about a second axis J2 orthogonal to the first axis J1, and the link 13 is, for example, a forearm which is supported so as to be capable or rotating relative to the link 12 about a third axis J3 parallel to the second axis J2.

The links 14 to 16 are triaxial wrists attached to link 13. The link 14 is, for example, a first wrist element which is supported so as to be capable of rotating relative to the link 13 about a fourth axis J4 orthogonal to the third axis J3, the link 15 is, for example, a second wrist element which is supported so as to be capable of rotating relative to the link 14 about a fifth axis J5 orthogonal to the fourth axis J4, and the link 16 is, for example, a third wrist element which is supported so as to be capable of rotating relative to the link 15 about a sixth axis J6 orthogonal to the fifth axis J5.

The machine 2 further comprises a tool 17 which is detachably attached to the tip of the machine 2. Though the tool 17 is configured as a hand tool for holding a workpiece W1, it is not limited to this, and in another embodiment, it may be configured as another type of tool such as a welding tool, a screw fastening tool, a deburring tool, or a polishing tool. The machine 2 of the first embodiment performs the operation of fitting the cylindrical workpiece W1 held by the hand into a concave workpiece W2.

Though not illustrated, the machine 2 comprises one or more actuators for driving the links 11 to 16, and one or more torque sensors for detecting the torque acting on the links 11 to 16. The actuators are provided near the connecting parts of the links 11 to 16. Though the actuators are configured as an electric actuator comprising an electric motor, an encoder, and a speed reducer, they are not limited to this, and in another embodiment, they may be configured as another actuator such as a hydraulic or a pneumatic actuator. The torque sensors are provided at the connection parts between the links 11 to 16. Though the torque sensors are configured as a strain gauge torque sensor, they are not limited to this, and in another embodiment, they may be configured as another torque sensor such as a piezoelectric, optical, or capacitance torque sensor.

Though the controller 3 comprises a programmable logic controller (PLC), it is not limited to this, and in another embodiment, it may be configured as another type of computer comprising a processor, memory, and input/output interfaces, which are connected to each other via buses. Though the controller 3 comprises a drive circuit for driving the actuators, in another embodiment, the machine 2 may comprise the drive circuit for driving the actuators. The controller 3 is connected to the actuator and torque sensors via wire or wirelessly. The controller 3 sends operation command values to the actuator and receives operation detection values from the actuator. Furthermore, the controller 3 receives the detected torque values from the torque sensors.

The controller 3 sets various coordinate systems such as a world coordinate system, a machine coordinate system, a flange coordinate system, a tool coordinate system, a camera coordinate system, and a user coordinate system. These coordinate systems are configured as, for example, orthogonal coordinate systems. In order to facilitate explanation, it will be assumed that the controller 3 sets a machine coordinate system C1, a tool coordinate system C2, and a user coordinate system C3. The machine coordinate system C1 is fixed to a reference position of the machine 2, for example, the base, the tool coordinate system C2 is fixed to a reference position of the tool 17, for example, the tool center point (TCP), and the user coordinate system C3 is fixed to an arbitrary position, for example, the workpiece W2.

It is assumed that the controller 3 sets the control point P, which is the control target portion of the machine 2, to the origin (i.e., TCP) of the tool coordinate system C2. Thus, the position and orientation of the control target portion of machine 2 are represented by the position and orientation of tool coordinate system C2 in the machine coordinate system C1. The controller 3 controls the operation of the machine 2 in accordance with an operation program created by the teaching device 4. The operation program includes operation commands for moving the position and orientation of the control target portion of the machine 2 to a teaching point constituting a motion trajectory of the control target portion of the machine 2.

Though the teaching device 4 consists of a teaching operation panel which is directly assembled with the controller 3, it is not limited thereto, and in another embodiment, the teaching device 4 may consist of another type of computer device such as a portable teaching pendant, a tablet, a personal computer, or a server device which is communicatively connected to the controller 3 by wire or wirelessly. Though not illustrated, the teaching device 4 comprises a processor, memory, input/output interface, and user interface which are interconnected via buses. The user interface is composed of an input unit such as a touch panel, a display, or a keyboard, and a display unit. The teaching device 4 is connected to the controller 3 via wire or wirelessly. Though not illustrated, the teaching device 4 includes program creation software for creating an operating program for the machine 2. The teaching device 4 transmits the created operating program to the controller 3.

In the machine system 1 configured as described above, the controller 3 performs force control or mass measurement using torque sensors attached to the links 11 to 16. The controller 3 measures the force acting on the control point P of the machine 2 from the detected values of the torque sensors, and performs force control or mass measurement based on the measurement results. However, due to the long distances from the torque sensors to the control point P, force noise increases when converting the detected values of the torque sensors to the force acting on the control point P. Furthermore, due to the rigidity of the links 11 to 16, the force actually generated at the control point P and the force acting on the control point P determined from the torque sensors may diverge.

Thus, in the first embodiment, torque sensor adjustment (i.e., calibration processing) is performed using a force sensor 50, which is external equipment. When adjusting the torque sensors, the force sensor 50 is attached near the control point P of the machine 2 (for example, between the wrist link 16 and the tool 17). Since the force sensor 50 is installed near the control point P of the machine 2, the force acting on the control point P determined from the detected value of the force sensor 50 is more accurate than the force acting on the control point P determined from the detected values of the torque sensors. Thus, the controller 3 calculates the correction amounts of the torque sensors by comparing the force acting on the control point P of the machine 2 calculated from the detected values of the torque sensors with the force acting on the control point P of the machine 2 calculated from the detected value of the force sensor 50, using the force acting on the control point P obtained from the detected value of the force sensor 50 as a reference value. After adjusting the torque sensors, the controller 3 performs force control or mass measurement by applying the correction amounts of the torque sensors to the force acting on the control point P of the machine 2, which is determined from the detected values of the torque sensors.

Though the force sensor 50 is composed of a six-axis force sensor and detects force in three axes and moments about three axes, it is not limited thereto, and in another embodiment, the sensor may be composed of a triaxial force sensor and detect only forces in the three axial directions. Specifically, the force sensor 50 is configured as a force sensor of at least one axis or more, depending on the operation contents of the machine 2.

Figure 1B:
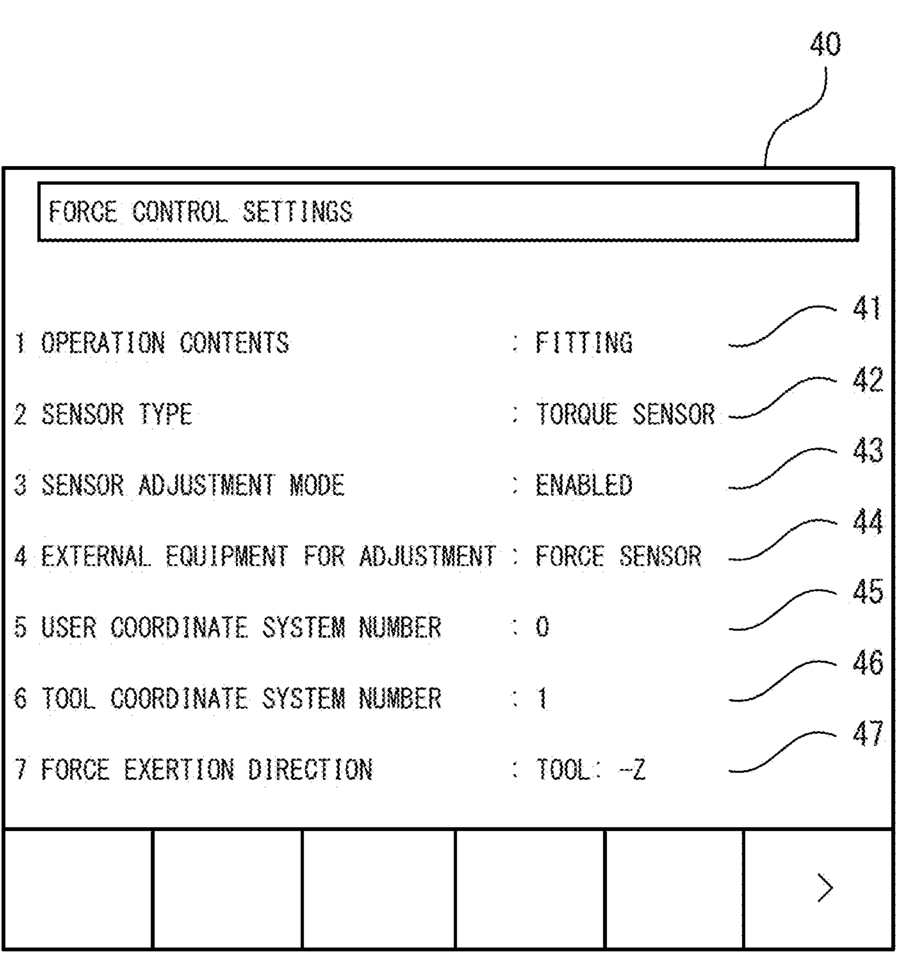
FIG. 1B shows a force control settings screen of the first embodiment.

When adjusting the torque sensors, the teaching device 4 is used to set parameters such as the operation contents of the machine 2, the sensor adjustment mode, and the external equipment used for adjusting the torque sensors. FIG. 1B shows a force control settings screen 40 of the first embodiment. The force control settings screen 40 is displayed on the display unit of the teaching device 4. On the force control settings screen 40, the operation contents 41 of the machine 2, the sensor type 42 used for force measurement, the sensor adjustment mode 43, the external equipment 44 for adjustment, the user coordinate system number 45, the tool coordinate system number 46, and the force exertion direction 47 are set.

In the first embodiment, since the machine 2 performs the operation of fitting the cylindrical workpiece W1 held by the hand into the concave workpiece W2, the operation contents 41 of the machine 2 is set to "fitting" on the force control settings screen 40. The reason for setting the operation contents 41 is that since the force acting on the control point P of the machine 2 determined from the detected values of the torque sensors depends on the position and orientation of the control target part of the machine 2, the calculated correction amounts of the torque sensors also depend on the operation contents 41 of the machine 2. Specifically, the controller 3 adjusts the torque sensors in accordance with the operation contents 41 of the machine 2. Note that as will be described in an embodiment below, the operation contents 41 of the machine 2 can be switched to any one of "face alignment", "phase alignment", "screw fastening", "constant force pressing", "polishing", and "deburring" in addition to "fitting."

Since the controller 3 uses the torque sensors to measure the force acting on the control point P of the machine 2, in the force control settings screen 40, the sensor type 42 used for force measurement is set to "torque sensor." Though different from the concept of the present disclosure, when performing force control or mass measurement using the force sensor 50, the sensor type 42 used for force measurement is set to "force sensor." As a prerequisite condition of the present disclosure, if the user does not have a force sensor 50 or if the number of force sensors 50 is small compared to the number of machines 2, it is assumed that force control, mass measurement, etc., will be performed using torque sensors, which have a lower accuracy than the force sensor 50.

When adjusting the torque sensors, the sensor adjustment mode 43 is set to "enabled" on the force control settings screen 40. While the sensor adjustment mode 43 is set to "enabled", the controller 3 executes torque sensor correction calculations. When torque sensor adjustment is complete, the sensor adjustment mode 43 is automatically set to "complete." Since it is difficult for the user to determine when the torque sensor adjustment has completed, and there is a risk that the user may forget to set the sensor adjustment mode 43 to "complete", for example, when a predetermined number of repetitions of torque sensor adjustment have been performed or when the torque sensor adjustment result (correction amount) converges (when the torque sensor correction amount of each repetition becomes less than a predetermined threshold), the sensor adjustment mode 43 is preferably automatically set to "complete." Note that if torque sensor adjustment is not to be performed, the sensor adjustment mode 43 is preferably set to "disabled." While the sensor adjustment mode 43 is set to "disabled", the controller 3 does not perform torque sensor correction calculations. Though different from the concept of the present disclosure, for example, if force control or mass measurement is performed using a force sensor 50 installed near the control point P of the machine 2, the sensor adjustment mode 43 is preferably set to "disabled." Alternatively, the sensor adjustment mode 43 may be switched to "enabled" or "disabled" in order to compare the accuracy when torque sensor adjustment is performed and when torque sensor adjustment is not performed.

In the first embodiment, since the force sensor 50 is used as the external equipment used for adjusting the torque sensor, the external equipment 44 for adjustment is set to "force sensor" on the force control settings screen 40. Note that as described in the embodiments below, the external equipment 44 for adjustment can be switched to any one of a "workpiece a having known mass", "visual sensor", etc., in addition to "force sensor".

Furthermore, in the first embodiment, since the user coordinate system C3 in which the user coordinate system number is "0" and the tool coordinate system C2 in which the tool coordinate system number is "1" are used, on the force control settings screen 40, the user coordinate system number 45 is set to "0" and the tool coordinate system number 46 is set to "1."

Further, in the first embodiment, since the force exertion direction when fitting the cylindrical workpiece W1 in the concave workpiece W2 is the −Z axis direction of the tool coordinate system C2, on the force control settings screen

40, the force exertion direction 47 is set to the "−Z" axis direction of the "tool" coordinate system. Note that when setting in the −Z axis direction of the user coordinate C3, it is preferable to set the force exertion direction 47 to the "−Z" axis direction of the "user" coordinate system.

When force control setting is performed as described above, the machine 2 performs an operation to fit the cylindrical workpiece W1 into the concave workpiece W2 using the force sensor 50, and the controller 3 records time-series data of the detected values of the force sensor 50 and time-series data of the detected values of the torque sensors during the fitting operation in the memory as internal data. After the fitting operation is complete, the controller 3 calculates the correction amounts of the torque sensors based on the internal data recorded in the memory. Specifically, the controller 3 performs adjustment of the torque sensors.

An example of a method for calculating the correction amounts of the torque sensors will be described below. The calculation processing of the correction amounts of the torque sensors includes (1) calculation processing to convert the detected values of the torque sensors into a force acting on the control point P of the machine 2, and (2) calculation processing to calculate the correction amounts of the torque sensors by comparing the force acting on the control point P obtained from the detected values of the torque sensors and the force acting on the control point P obtained from the detected value of the force sensor 50.

First, an example of the (1) calculation processing to convert the detected values of the torque sensors into a force acting on the control point P of the machine 2 will be described. The relational expression between the detected value bi of the ith axis torque sensor and the force acting on the control point P of the machine 2 (force F and moment M in the present example) can be expressed, for example, as described below.

[Math 1]

$$bi = \overrightarrow{Di}\cdot\left(\vec{F}\times\overrightarrow{Li}+\vec{M}\right) \quad \text{Formula 1}$$

where:

bi: detected value of ith torque sensor $\overrightarrow{Di}$: unit vector of axial direction of ith torque sensor, $\overrightarrow{Di}$=(Dxi Dyi, Dzi)'

$\vec{F}$: force vector acting on control point P, $\vec{F}$=(Fx, Fy, Fz)'

$\overrightarrow{Li}$: distance vector from control point P to center of ith torque sensor, $\overrightarrow{Li}$=(Lxi, Lyi, Lzi)'

$\vec{M}$: moment vector acting on control point P, $\vec{M}$=(Mx, My, Mz)'

In other words, the following relational expression holds true regarding the ith axis torque sensor.

[Math 2]

$$bi = \left(\overrightarrow{Li}\times\overrightarrow{Di}\right)\cdot\vec{F}+\overrightarrow{Di}\cdot\vec{M} \quad \text{Formula 2}$$

-continued

[Math 3]

$$bi = (Lyi\times Dzi - Lzi\times Dyi)\cdot Fx + (Lzi\times Dxi - Lxi\times Dzi)\cdot Fy + (Lxi\times Dyi - Lyi\times Dxi)\cdot Fz + Dxi\times Mx + Dyi\times My + Dzi\times Mz \quad \text{Formula 3}$$

When formula 3 is summarized as a determinant, it can be expressed by the following formula.

[Math 4]

$$b = A * r \quad \text{Formula 4}$$

where:

$$b = (\ldots, bi, \ldots)^T, i = 1-6$$

$$A = \begin{pmatrix} a_{11} & \cdots & a_{16} \\ \vdots & \ddots & \vdots \\ a_{61} & \cdots & a_{66} \end{pmatrix}$$

$$(a_{i1}, \ldots, a_{i6}) = (Lyi\times Dzi - Lzi\times Dyi, Lzi\times Dxi - Lxi\times Dzi, Lxi\times Dyi - Lyi\times Dxi, Dxi, Dyi, Dzi)$$

$$r = (Fx, Fy, Fz, Mx, My, Mz)^T$$

The six unknowns, force vector F, and moment vector M can be determined from the six simultaneous equations in Formula 4. As described above, the detected values of the torque sensors are converted into a force acting on the control point P (force F and moment M in the present example).

Next, an example of the (2) calculation processing to calculate the correction amounts of the torque sensors by comparing the force acting on the control point P obtained from the detected values of the torque sensors and the force acting on the control point P obtained from the detected value of the force sensor 50 will be described. The formula for calculating the correction amounts of the torque sensors (the force correction amount CF and the moment correction amount CM in the present example) can be expressed as follows.

[Math 5]

$$\overrightarrow{Fs} = CFi\cdot\overrightarrow{Ft}, i = 1\sim3 \quad \text{Formula 5}$$

$$\overrightarrow{Ms} = CMi\cdot\overrightarrow{Mt}, i = 1\sim3$$

where:

$\overrightarrow{Fs}$: three force components acting on control point P determined from detected value of force sensor $\overrightarrow{Ms}$: three moment components acting on control point P determined from detected value of force sensor $\overrightarrow{Ft}$: three force components acting on control point P determined from detected values of torque sensors $\overrightarrow{Mt}$: three moment components acting on control point P determined from detected values of torque sensors CRi: correction amount of torque sensor of three force components CMi: correction amount of torque sensor of three moment components The correction amounts of the torque sensors are calculated as described above. Note that though each torque sensor correction amount is calculated as an average value obtained by averaging the correction amounts obtained from the time-series data of the detected values of the torque sensor and force sensor over the entire fitting operation, it is not limited thereto, and in another embodiment, it may be calculated as an average value obtained by averaging the correction amounts obtained from the time-series data of the detected values of the torque sensor and force sensor for each predetermined operation section during the fitting operation or for each predetermined time interval during the fitting operation.

Each calculated torque sensor correction amount is recorded in the memory of the controller 3 as internal data. As a result, the torque sensor adjustment (calibration process) is complete. At this time, the teaching device 4 switches the sensor adjustment mode 43 to "complete" on the force control settings screen 40 shown in FIG. 1B.

After adjusting the torque sensors, the force sensor 50 is removed from the machine 2. The removed force sensor 50 can be used on another machine. Specifically, force control, mass measurement, etc., may be performed using the force sensor 50 on another machine, and alternatively, force control, mass measurement, etc., may be performed using the torque sensors after performing adjustment of the torque sensors using the force sensor 50 as external equipment on another machine.

The machine 2 uses the torque sensors to fit another cylindrical workpiece W1 into an another concave workpiece W2 in the next or subsequent operations, and the controller 3 performs force control with high precision by applying the adjustment results (correction amounts) of the torque sensors to the force acting on the control point P determined from the detected values of the torque sensors. Specifically, the controller 3 can execute force control with approximately the same accuracy as the force sensor 50.

An example of the method for applying the correction amounts of the torque sensors will be described below. The process for applying the correction amounts of the torque sensors includes (3) calculation processing to convert the detected values of the torque sensors into a force acting on the control point P of the machine 2, and (4) calculation processing to apply the correction amounts of the torque sensors to a force acting on the control point P before correction obtained from the detected values of the torque sensors. Note that the calculation process in (3) is the same as the calculation process in (1) described above, and thus, description thereof has been omitted.

An example of the (4) calculation processing to apply the correction amounts of the torque sensors to a force acting on the control point P before correction obtained from the detected values of the torque sensors will be described. As expressed by the following formula, the value obtained by multiplying the correction amounts of the torque sensors (the force correction amount CF and the moment correction amount CM in the present example) by the force acting on the control point P before correction (force F1t and moment M1t in the present example) calculated from the detected value of the torque sensor is defined as the corrected force acting on the control point P (force F2t and moment M2t in the present example).

[Math 6]

$$\overrightarrow{F_{2t}} = CFi \cdot \overrightarrow{F_{1t}},\ i = 1 \sim 3 \quad \text{Formula 6}$$

-continued $$\overrightarrow{M_{2t}} = CMi \cdot \overrightarrow{M_{1t}},\ i = 1 \sim 3$$

where:

$\overrightarrow{F2t}$: three force components acting on control point P determined from detected value of torque sensor after correction $\overrightarrow{M2t}$: three moment components acting on control point P determined from detected value of torque sensor after correction $\overrightarrow{F1t}$: three force components acting on control point P determined from detected values of torque sensors before correction $\overrightarrow{M1t}$: three moment components acting on control point P determined from detected values of torque sensors before correction CFi: correction amount of torque sensor of three force components CMi: correction amount of torque sensor of three moment components The correction amounts of the torque sensors are applied as described above. Note that though a single correction amount is applied throughout the entire fitting operation, the application of the correction amounts is not limited thereto, and in another embodiment, a single correction amount may be applied at each predetermined operation section during the fitting operation or at each predetermined time interval during the fitting operation.

Furthermore, in the first embodiment, though the torque sensors are adjusted using the detected values of the force sensor 50 during the fitting operation, in another embodiment, the torque sensors may be adjusted using the detected values of the force sensor 50 during any one of the phase alignment operation, screw fastening operation, and constant force pressing operation.

Figure 2A:
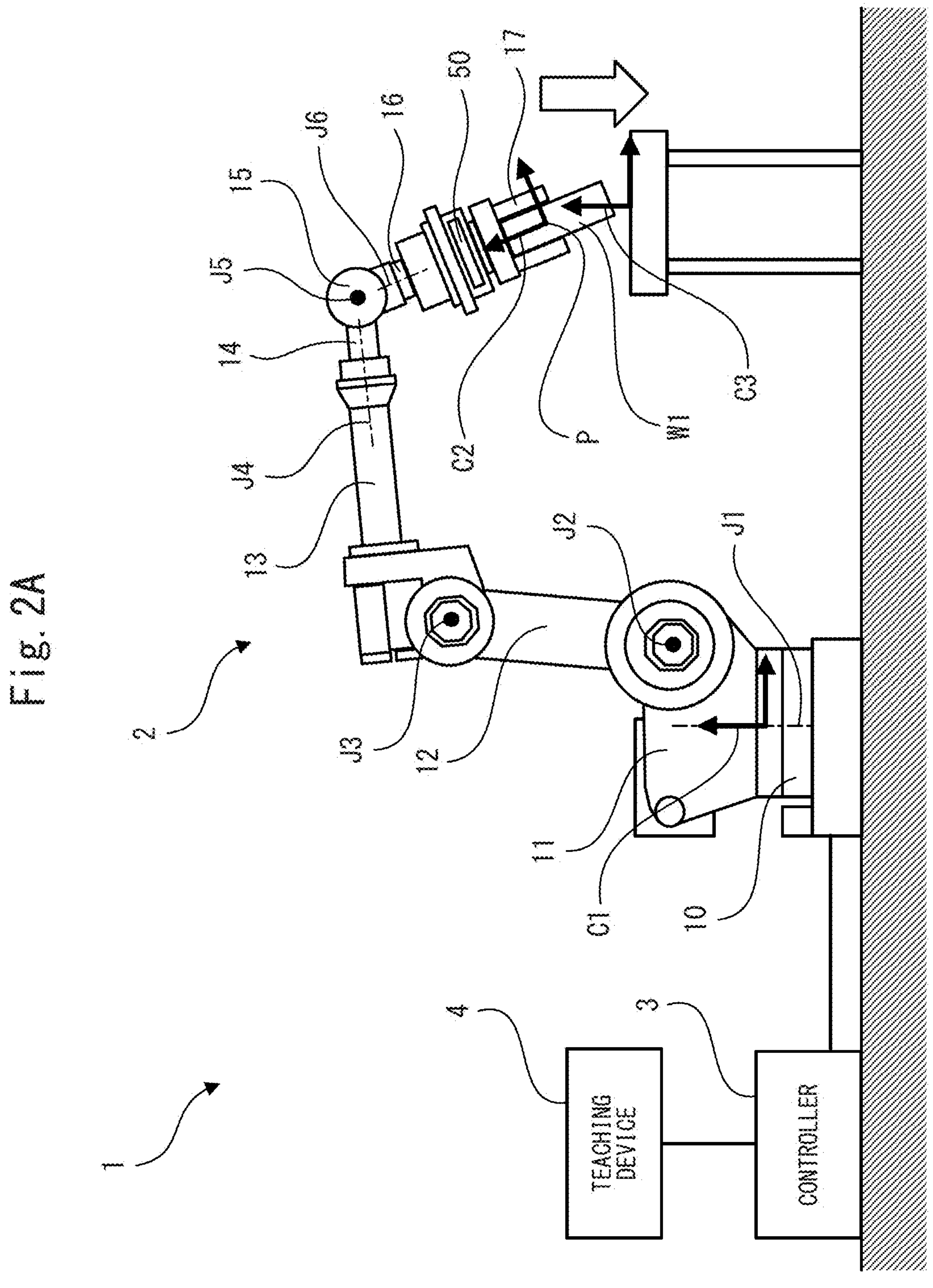
FIG. 2A is a configuration view of the machine system of a second embodiment.

The machine system 1 of a second embodiment will be described below. FIG. 2A is a configuration view of the machine system 1 of the second embodiment. Since the configuration of the machine system 1 of the second embodiment is the same as the configuration of the machine system 1 of the first embodiment, description thereof has been omitted. In the second embodiment, though torque sensor adjustment (i.e., calibration processing) is performed using the force sensor 50, which is external equipment, the machine 2 of the second embodiment differs from the first embodiment in that the machine 2 performs the operation of aligning the bottom surface of a cylindrical workpiece W1 held by a hand with an object.

Figure 2B:
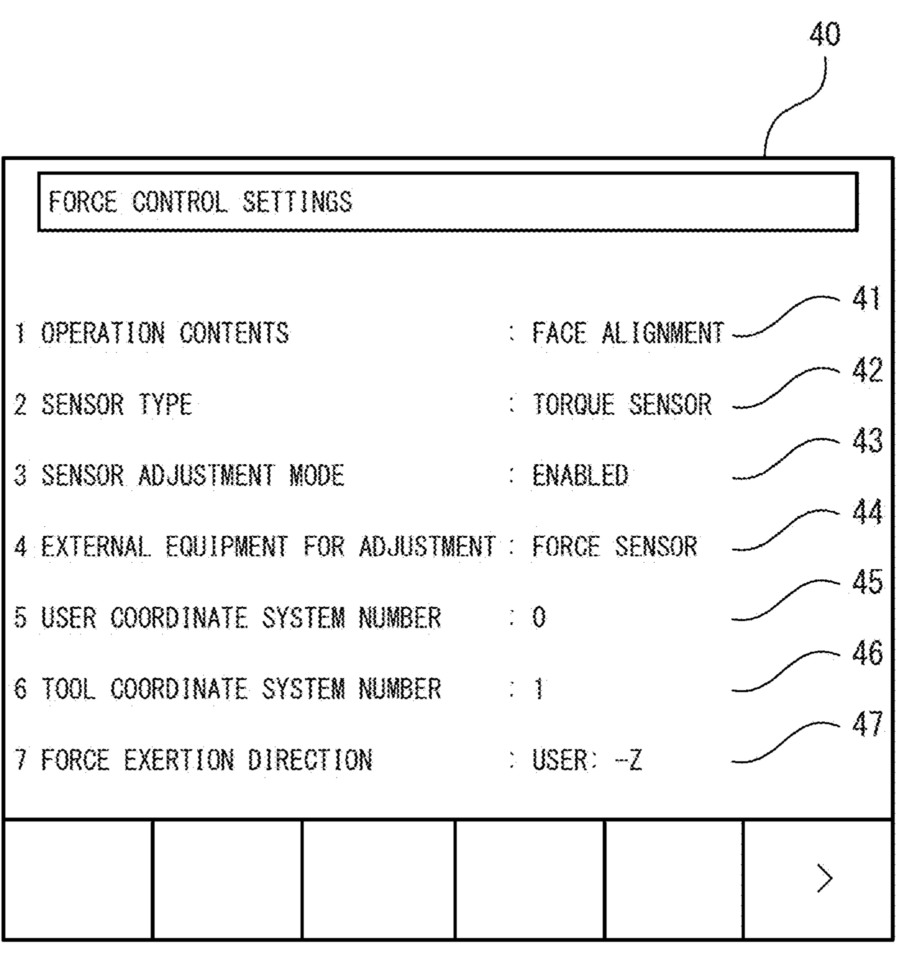
FIG. 2B shows a force control settings screen of the second embodiment.

When adjusting the torque sensors, parameters such as the operation contents of the machine 2, the sensor adjustment mode, and the external equipment used for adjusting the torque sensors are set using the teaching device 4. FIG. 2B shows the force control settings screen 40 of the second embodiment. In the second embodiment, in order for the machine 2 to perform the operation of aligning the bottom surface of the cylindrical workpiece W1 held by the hand with the object, the operation contents 41 of the machine 2 is set to "alignment" on the force control settings screen 40.

Since the controller 3 uses the torque sensors to measure the force acting on the control point P of the machine 2, on the force control settings screen 40, the sensor type 42 used for force measurement is set to "torque sensor." Furthermore, when adjusting the torque sensors, the sensor adjustment mode 43 is set to "enabled" on the force control settings screen 40. While the sensor adjustment mode 43 is set to "enabled", the controller 3 executes torque sensor correction calculations. When torque sensor adjustment is complete, the sensor adjustment mode 43 is automatically set to "complete." Since it is difficult for the user to determine when the torque sensor adjustment is complete, and there is a risk that the user may forget to set sensor adjustment mode 43 to "complete", for example, when a predetermined number of repetitions of torque sensor adjustment have been performed or when the torque sensor adjustment result (correction amount) converges (when the torque sensor correction amount of each repetition becomes less than a predetermined threshold), the sensor adjustment mode 43 is preferably automatically set to "complete." Note that if torque sensor adjustment is not to be performed, the sensor adjustment mode 43 is preferably set to "disabled." In the second embodiment, since the force sensor 50 is used as the external equipment used for adjusting the torque sensors, the external equipment 44 for adjustment is set to "force sensor" on the force control settings screen 40.

Further, in the second embodiment, since the user coordinate system C3 in which the user coordinate system number is "0" and the tool coordinate system C2 in which the tool coordinate system number is "1" are used, on the force control settings screen 40, the user coordinate system number 45 is set to "0" and the tool coordinate system number 46 is set to "1." Further, in the second embodiment, since the force exertion direction when aligning the bottom surface of the cylindrical workpiece W1 with the object is the −Z axis direction of the user coordinate system C3, on the force control settings screen 40, the force exertion direction 47 is set to the "−Z" axis direction of the "user" coordinate system.

When force control setting is performed as described above, the machine 2 uses the force sensor 50 to align the bottom surface of the cylindrical workpiece W1 with the target object, and the controller 3 records time-series data of the detected values of the force sensor 50 and time-series data of the detected values of the torque sensors during the face alignment operation in the memory as internal data. After the face alignment operation is complete, the controller 3 calculates the correction amounts of the torque sensors based on the internal data recorded in the memory. Specifically, the controller 3 performs adjustment of the torque sensor.

Since the calculation processing for the correction amounts of the torque sensors is the same as the calculation processing of (1) and (2) of the first embodiment, description thereof has been omitted. Though the correction amount of each torque sensor is calculated as an average value obtained by averaging the correction amount obtained from the time-series data of the detected values of the torque sensor and force sensor over the entire face alignment operation, it is not limited thereto, and in another embodiment, the correction amount obtained from the time-series data of the detected values of the torque sensor and the force sensor may be calculated as an average value averaged for each predetermined movement section during the face alignment operation or for each predetermined time interval during the face alignment operation.

The calculated torque sensor correction amounts are recorded in the memory of the controller 3 as internal data. As a result, the torque sensor adjustment (calibration process) is complete. At this time, the teaching device 4 automatically switches the sensor adjustment mode 43 to "complete" on the force control settings screen 40 shown in FIG. 2B.

After adjusting the torque sensors, the force sensor 50 is removed from machine 2. The removed force sensor 50 can be used on another machine. Specifically, force control, mass measurement, etc., may be performed using the force sensor 50 on another machine, and alternatively, force control, mass measurement, etc., may be performed using the torque sensors after performing adjustment of the torque sensors using the force sensor 50 as external equipment on another machine.

The machine 2 uses the torque sensors to align the bottom surface of another cylindrical workpiece W1 with the object in the next and subsequent operations, and the controller 3 performs force control with high precision by applying the adjustment results (correction amounts) of the torque sensors to the force acting on the control point P determined from the detected value of the torque sensor. Specifically, the controller 3 can execute force control with approximately the same accuracy as the force sensor 50.

Since the method of applying the torque sensor correction amount is the same as the calculation processing of (3) and (4) of the first embodiment, description thereof has been omitted. Note that though a single correction amount is applied throughout the entire face alignment operation, the application of the correction amounts is not limited thereto, and in another embodiment, a single correction amount may be applied at each predetermined operation section during the face alignment operation or at each predetermined time interval during the face alignment operation.

Figure 3A:
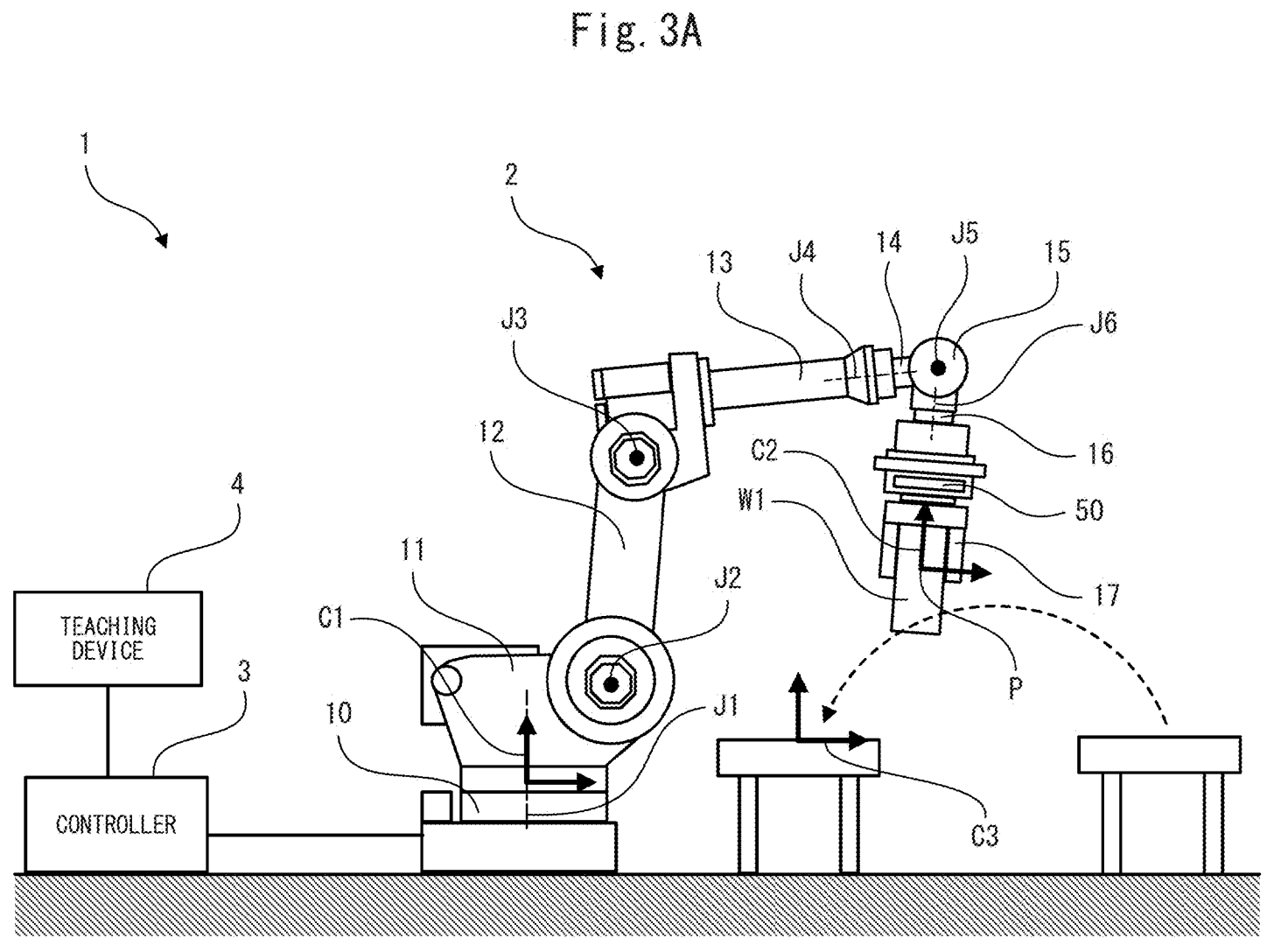

The machine system 1 of a third embodiment will be described below. FIG. 3A is a configuration view of the machine system 1 of the third embodiment. Since the configuration of the machine system 1 of the third embodiment is the same as the configuration of the machine system 1 of the first embodiment, description thereof has been omitted. In the third embodiment, torque sensor adjustment (i.e., calibration processing) is performed using the force sensor 50, which is external equipment, and the machine 2 of the third embodiment differs from the first embodiment in that the machine 2 measures the mass of the workpiece W1 while conveying the workpiece W1 held by a hand from one position to another.

Figure 3B:
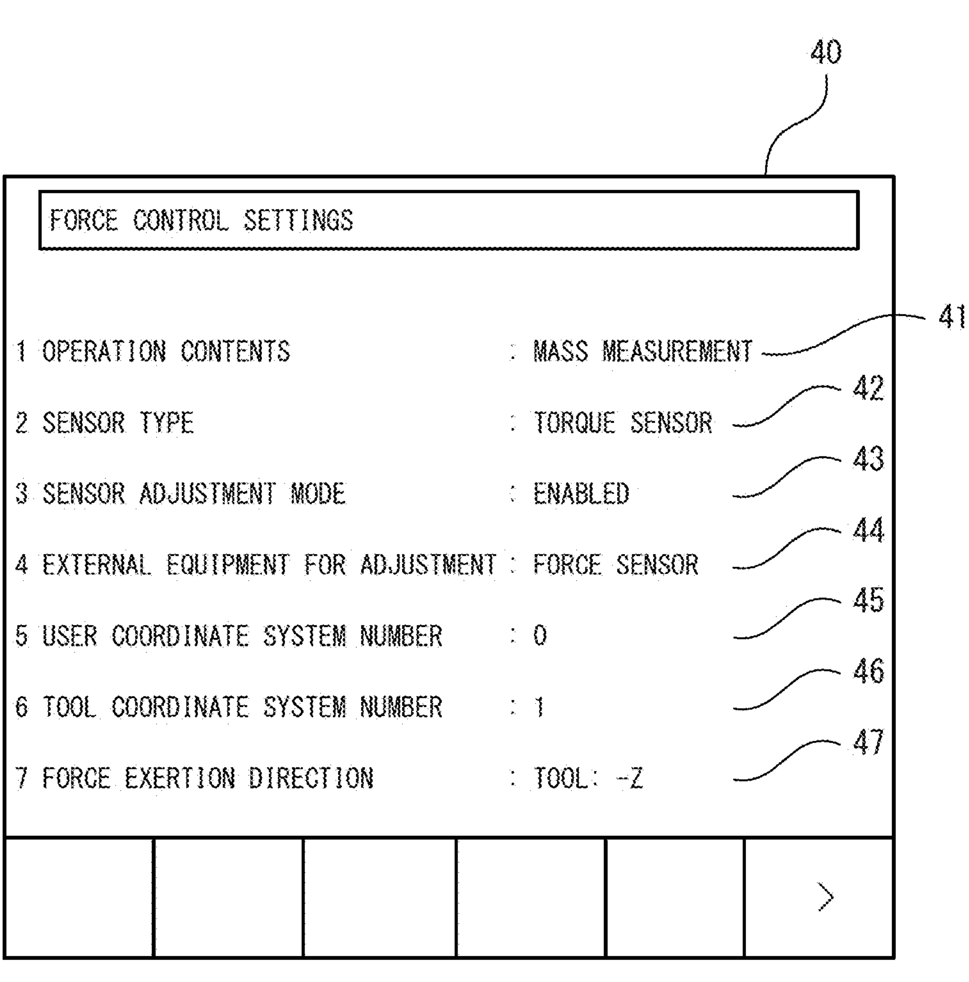
FIG. 3B shows a force control settings screen of the third embodiment.

When adjusting the torque sensors, the teaching device 4 is used to set parameters such as the operation contents of the machine 2, the sensor adjustment mode, and the external equipment used for adjusting the torque sensors. FIG. 3B shows the force control settings screen 40 of the third embodiment. In the third embodiment, since the machine 2 performs the operation of measuring the mass of the workpiece W1, the operation contents 41 of the machine 2 is set to "mass measurement" on the force control settings screen 40.

Since the controller 3 uses the torque sensors to measure the force acting on the control point P of the machine 2, in the force control settings screen 40, the sensor type 42 used for force measurement is set to "torque sensor." When adjusting the torque sensors, the sensor adjustment mode 43 is set to "enabled" on the force control settings screen 40. While the sensor adjustment mode 43 is set to "enabled", the controller 3 executes torque sensor correction calculations. When torque sensor adjustment is complete, the sensor adjustment mode 43 is automatically set to "complete." Since it is difficult for the user to determine when the torque sensor adjustment is complete, and there is a risk that the user may forget to set sensor adjustment mode 43 to "complete", for example, when a predetermined number of repetitions of torque sensor adjustment have been performed or when the torque sensor adjustment result (correction amount) converges (when the torque sensor correction amount of each repetition becomes less than a predetermined threshold), the sensor adjustment mode 43 is preferably automatically set to "complete." Note that if torque sensor adjustment is not to be performed, the sensor adjustment mode 43 is preferably set to "disabled." In the third embodiment, since the force sensor 50 is used as the external equipment used for adjusting the torque sensors, the external equipment 44 for adjustment is set to "force sensor" on the force control settings screen 40.

Further, in the third embodiment, since the user coordinate system C3 in which the user coordinate system number is "0" and the tool coordinate system C2 in which the tool coordinate system number is "1" are used, on the force control settings screen 40, the user coordinate system number 45 is set to "0" and the tool coordinate system number 46 is set to "1." Further, in the third embodiment, though not indispensable, if the force exertion direction when measuring the mass of the workpiece W1 is the −Z axis direction of the tool coordinate system C2, on the force control settings screen 40, the force exertion direction 47 is set to the "−Z" axis direction of the "tool" coordinate system.

When force control setting is performed as described above, the machine 2 measures the mass of workpiece W1 using the force sensor 50 while transporting workpiece WI held by the hand from one position to another, and the controller 3 records time-series data of the detected values of the force sensor 50 and time-series data of the detected values of the torque sensors during the mass measurement operation in the memory as internal data. After the mass measurement operation is complete, the controller 3 calculates the correction amounts of the torque sensors based on the internal data recorded in the memory. Specifically, the controller 3 performs adjustment of the torque sensor.

Since the calculation processing for the correction amounts of the torque sensors is the same as the calculation processing of (1) and (2) of the first embodiment, description thereof has been omitted. Though each torque sensor correction amount is calculated as an average value obtained by averaging the correction amount obtained from the time-series data of the detected values of the torque sensor and force sensor over the entire mass measurement operation, it is not limited thereto, and in another embodiment, the correction amount obtained from the time-series data of the detected values of the torque sensor and the force sensor may be calculated as an average value averaged for each predetermined movement section during the mass measurement operation or for each predetermined time interval during the mass measurement operation.

Each calculated torque sensor correction amount is recorded in the memory of the controller 3 as internal data. As a result, the torque sensor adjustment (calibration process) is complete. At this time, the teaching device 4 switches the sensor adjustment mode 43 to "complete" on the force control settings screen 40 shown in FIG. 3B.

After adjusting the torque sensors, the force sensor 50 is removed from the machine 2. The removed force sensor 50 can be used on another machine. Specifically, force control, mass measurement, etc., may be performed using the force sensor 50 on another machine, and alternatively, force control, mass measurement, etc., may be performed using the torque sensors after performing adjustment of the torque sensor using the force sensor 50 as external equipment on another machine.

The machine 2 uses the torque sensors to measure the mass of another workpiece W1 while transporting another workpiece WI held by the hand from one position to another in the next and subsequent operations, and the controller 3 performs mass measurement with high precision by applying the adjustment results (correction amounts) of the torque sensors to the force acting on the control point P determined from the detected value of the torque sensor. Specifically, the controller 3 can perform mass measurement with approximately the same accuracy as the force sensor 50.

Since the method of applying the torque sensor correction amount is the same as the calculation processing of (3) and (4) of the first embodiment, description thereof has been omitted. Though a single correction amount is applied throughout the entire mass measurement operation, the application of the correction amounts is not limited thereto, and in another embodiment, a single correction amount may be applied at each predetermined operation section during the mass measurement operation or at each predetermined time interval during the mass measurement operation.

Figure 4A:
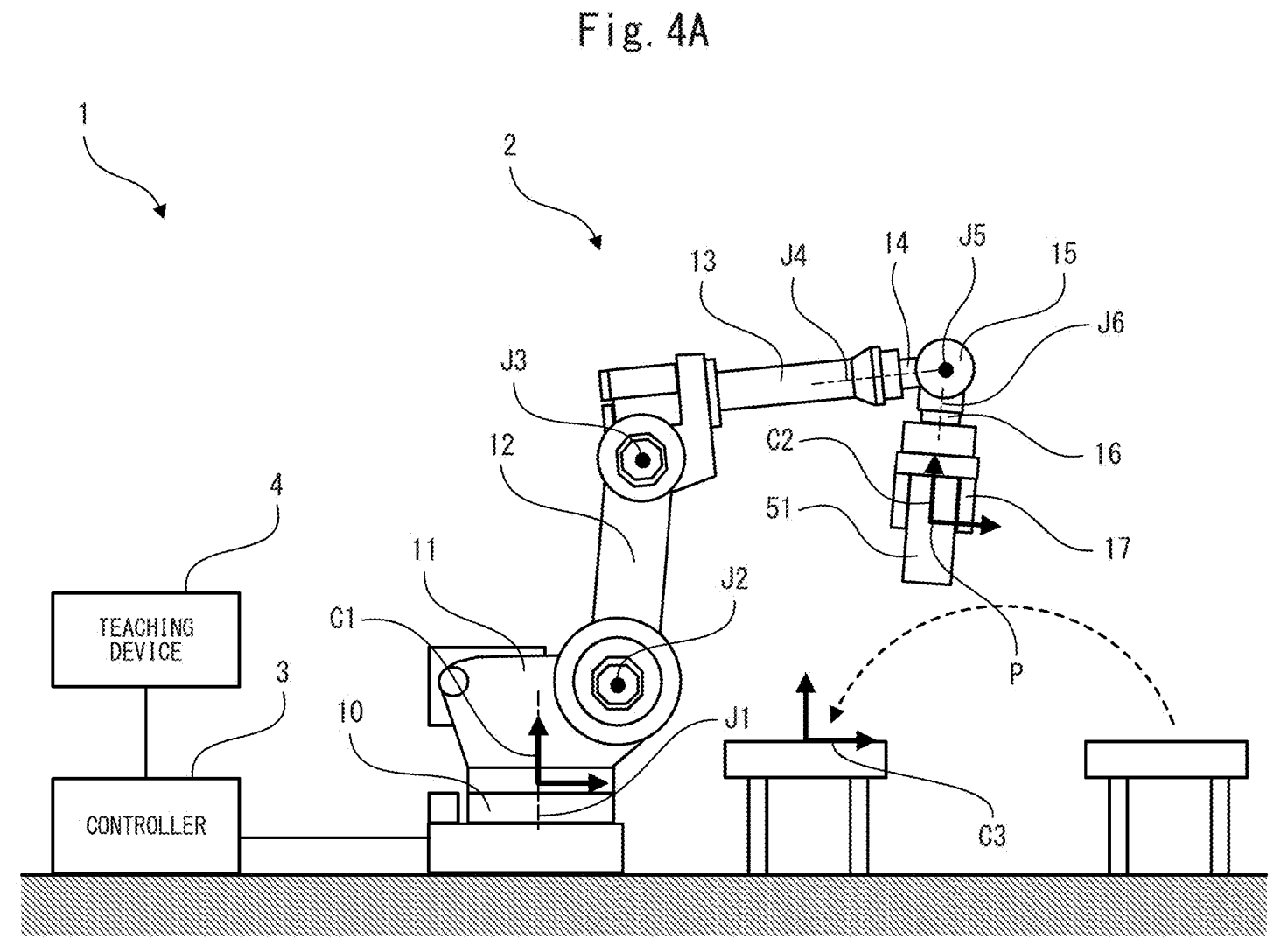

The machine system 1 of the fourth embodiment will be described below. FIG. 4A is a configuration view of the machine system 1 of the third embodiment. Though the configuration of the machine system 1 of the fourth embodiment is substantially the same as the configuration of the machine system 1 of the third embodiment, it differs from that of the third embodiment in that torque sensor adjustment (i.e., calibration processing) is performed using a workpiece 51 having a known mass as the external equipment in place of the force sensor 50.

Figure 4B:
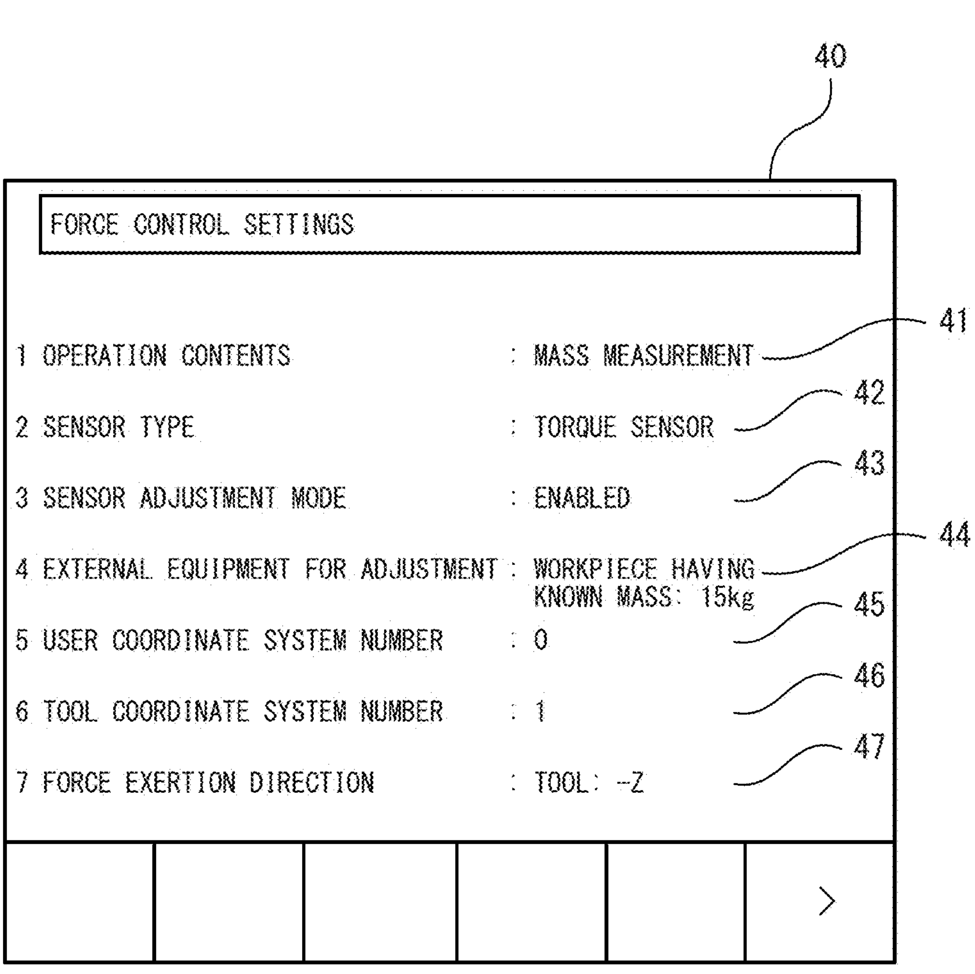
FIG. 4B shows a force control settings screen of the fourth embodiment.

When adjusting the torque sensors, the teaching device 4 is used to set parameters such as the operation contents of the machine 2, the sensor adjustment mode, and the external equipment used for adjusting the torque sensor. FIG. 4B shows the force control settings screen 40 of the fourth embodiment. In the fourth embodiment, since the machine 2 performs the operation of measuring the mass of the workpiece 51, the operation contents 41 of the machine 2 is set to "mass measurement" on the force control settings screen 40.

Since the controller 3 uses the torque sensors to measure the force acting on the control point P of the machine 2, on the force control settings screen 40, the sensor type 42 used for force measurement is set to "torque sensor." When adjusting the torque sensors, the sensor adjustment mode 43 is set to "enabled" on the force control settings screen 40. While the sensor adjustment mode 43 is set to "enabled", the controller 3 executes torque sensor correction calculations. When torque sensor adjustment is complete, the sensor adjustment mode 43 is automatically set to "complete." Since it is difficult for the user to determine when the torque sensor adjustment is complete, and there is a risk that the user may forget to set sensor adjustment mode 43 to "complete", for example, when a predetermined number of repetitions of torque sensor adjustment have been performed or when the torque sensor adjustment result (correction amount) converges (when the torque sensor correction amount of each repetition becomes less than a predetermined threshold), the sensor adjustment mode 43 is preferably automatically set to "complete". Note that if torque sensor adjustment is not to be performed, the sensor adjustment mode 43 is preferably set to "disabled." In the fourth embodiment, since the workpiece 51 having a known mass is used as the external equipment used for adjusting the torque sensor, the external equipment 44 for adjustment is set to "workpiece having known mass" on the force control settings screen 40. Furthermore, the mass of the workpiece 51 is set ("15 kg" in the present example).

Furthermore, in the fourth embodiment, since the user coordinate system C3 in which the user coordinate system number is "0" and the tool coordinate system C2 in which the tool coordinate system number is "1" are used, on the force control settings screen 40, the user coordinate system number 45 is set to "0" and the tool coordinate system number 46 is set to "1." Further, in the fourth embodiment, though not indispensable, if the force exertion direction when measuring the mass of the workpiece 51 is the −Z axis direction of the tool coordinate system C2, on the force control settings screen 40, the force exertion direction 47 is set to the "−Z" axis direction of the "tool" coordinate system.

When force control setting is performed as described above, the machine 2 measures the mass of workpiece W1 using the torque sensor while transporting workpiece W1 held by the hand from one position to another, and the controller 3 records time-series data of the detected values of the torque sensor during the mass measurement operation in the memory as internal data. After the mass measurement operation is complete, the controller 3 calculates the correction amounts of the torque sensors based on the internal data recorded in the memory. Specifically, the controller 3 performs adjustment of the torque sensor.

The calculation processing of the correction amounts of the torque sensors includes (1) calculation processing to convert the detected values of the torque sensors into a force acting on the control point P of the machine 2, and (2) calculation processing to calculate the torque sensor correction amount by comparing the force acting on the control point P determined from the detected values of the torque sensors and the known mass of the workpiece 51. Since the calculation processing (1) of the fourth embodiment is the same as the calculation processing of (1) of the first embodiment, description thereof has been omitted.

An example of the (2) calculation processing to calculate the torque sensor correction amount by comparing the force acting on the control point P determined from the detected values of the torque sensors and the known mass of the workpiece 51 will be described. The formula for calculating the correction amounts of the torque sensors (the force correction amount CF and the moment correction amount CM in the present example) is expressed as follows.

[Math 7]

$$\overrightarrow{Fw} = CFi \cdot \overrightarrow{Ft},\ i = 1\sim 3 \qquad \text{Formula 7}$$

$$\overrightarrow{Mw} = CMi \cdot \overrightarrow{Mt},\ i = 1\sim 3$$

where:

$\overrightarrow{Fw}$: three force components acting on control point P determined from known mass of workpiece $\overrightarrow{Mw}$: three moment components acting on control point P determined from known mass of workpiece $\overrightarrow{Ft}$: three force components acting on control point P determined from detected values of torque sensors $\overrightarrow{Mt}$: three moment components acting on control point P determined from detected values of torque sensors CFi: correction amount of torque sensor of three force components CMi: correction amount of torque sensor of three moment components The correction amounts of the torque sensors are calculated as described above. Note that though each torque sensor correction amount is calculated as an average value obtained by averaging the correction amount obtained from the time-series data of the detected values of the torque sensor and force sensor over the entire mass measurement operation, it is not limited to this, and in another embodiment, the correction amount obtained from the time-series data of the detected values of the torque sensor and the force sensor may be calculated as an average value averaged for each predetermined movement section during the mass measurement operation or for each predetermined time interval during the mass measurement operation.

Each calculated torque sensor correction amount is recorded in the memory of the controller 3 as internal data. As a result, the torque sensor adjustment (calibration process) is complete. At this time, the teaching device 4 switches the sensor adjustment mode 43 to "complete" on the force control settings screen 40 shown in FIG. 4B.

After adjusting the torque sensor, the workpiece 51 having a known mass can be used on another machine. Specifically, force control, mass measurement, etc., may be performed using the torque sensor after adjusting the torque sensor using the workpiece 51 having a known mass as the external equipment in another machine.

The machine 2 uses the torque sensor to measure the mass of another workpiece W1 while the machine 2 transports another workpiece W1 held by the hand from one position to another in the next and subsequent operations, and the controller 3 performs mass measurement with high precision by applying the adjustment results (correction amounts) of the torque sensors to the force acting on the control point P determined from the detected value of the torque sensor. Specifically, the controller 3 can perform mass measurement with approximately the same accuracy as the force sensor 50.

Since the method of applying the torque sensor correction amount is the same as the calculation processing of (3) and (4) of the first embodiment, description thereof has been omitted. Though a single correction amount is applied throughout the entire mass measurement operation, the application of the correction amounts is not limited thereto, and in another embodiment, a single correction amount may be applied at each predetermined operation section during the mass measurement operation or at each predetermined time interval during the mass measurement operation.

Figure 5A:
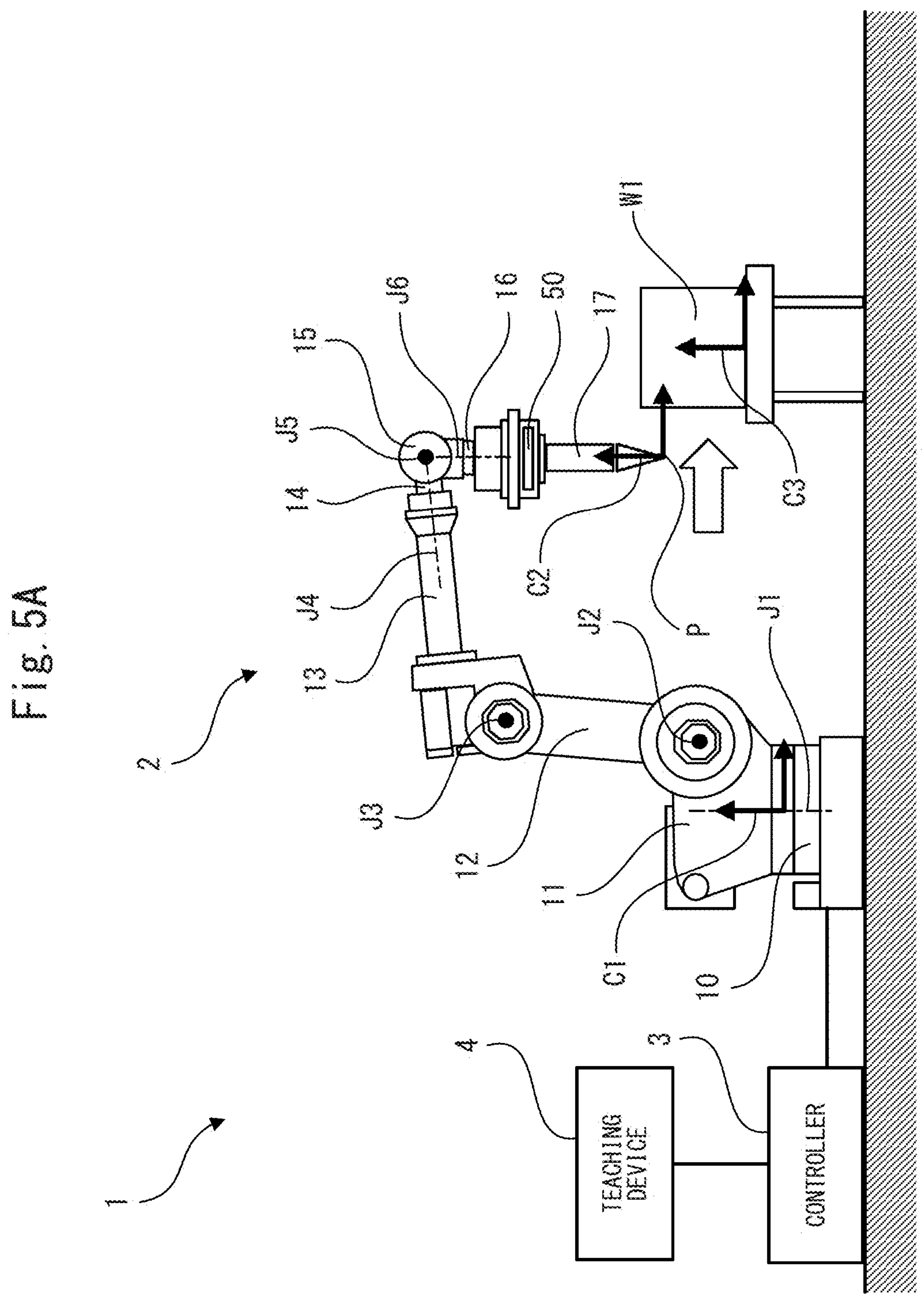
FIG. 5A is a configuration view of the machine system of a fifth embodiment.

The machine system 1 of a fifth embodiment will be described below. FIG. 5A is a configuration view of the machine system 1 according to the fifth embodiment. Since the configuration of the machine system 1 of the fifth embodiment is the same as the configuration of the machine system 1 of the first embodiment, description thereof has been omitted. In the fifth embodiment, torque sensor adjustment (i.e., calibration processing) is performed using the force sensor 50, which is external equipment, and the machine 2 of the fifth embodiment differs from the first embodiment in that the machine 2 uses a polishing tool to polish a side surface of the workpiece W1.

Figure 5B:
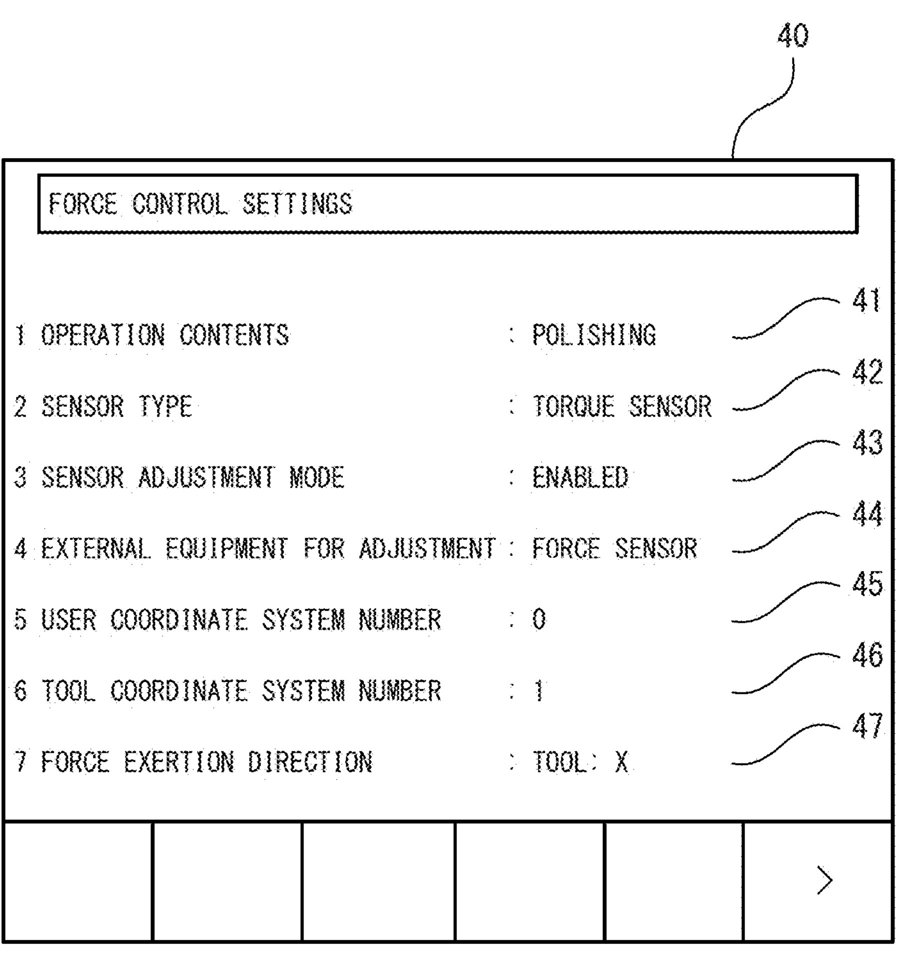
FIG. 5B shows a force control settings screen of the fifth embodiment.

When adjusting the torque sensor, the teaching device 4 is used to set parameters such as the operation contents of the machine 2, the sensor adjustment mode, and the external equipment used for adjusting the torque sensor. FIG. 5B shows the force control settings screen 40 of the fifth embodiment. In the fifth embodiment, since the machine 2 performs the operation of polishing the side surface of the workpiece W1 with a polishing tool, the operation contents 41 of the machine 2 is set to "polishing" on the force control settings screen 40.

Since the controller 3 uses the torque sensors to measure the force acting on the control point P of the machine 2, on the force control settings screen 40, the sensor type 42 used for force measurement is set to "torque sensor." When adjusting the torque sensor, the sensor adjustment mode 43 is set to "enabled" on the force control settings screen 40. While the sensor adjustment mode 43 is set to "enabled", the controller 3 executes torque sensor correction calculations. When torque sensor adjustment is complete, the sensor adjustment mode 43 is automatically set to "complete." Since it is difficult for the user to determine when the torque sensor adjustment is complete, and there is a risk that the user may forget to set sensor adjustment mode 43 to "complete", for example, when a predetermined number of repetitions of torque sensor adjustment have been performed or when the torque sensor adjustment result (correction amount) converges (when the torque sensor correction amount of each repetition becomes less than a predetermined threshold), the sensor adjustment mode 43 is preferably automatically set to "complete." Note that if torque sensor adjustment is not to be performed, the sensor adjustment mode 43 is preferably set to "disabled." In the fifth embodiment, since the force sensor 50 is used as external equipment used for adjusting the torque sensor, the external equipment 44 for adjustment is set to "force sensor" on the force control settings screen 40.

Further, in the fifth embodiment, since the user coordinate system C3 in which the user coordinate system number is "0" and the tool coordinate system C2 in which the tool coordinate system number is "1" are used, on the force control settings screen 40, the user coordinate system number 45 is set to "0" and the tool coordinate system number 46 is set to "1." Furthermore, in the fifth embodiment, since the force exertion direction when polishing the side surface of the workpiece W1 is the X-axis direction of the tool coordinate system C2, on the force control settings screen 40, the force exertion direction 47 is set to the "X" axis direction of the "tool" coordinate system.

When force control setting is performed as described above, the machine 2 uses the force sensor 50 to polish the side surface of workpiece W1, and the controller 3 records time-series data of the detected value of the force sensor 50 and time-series data of the detected values of the torque sensors during the polishing operation in the memory as internal data. After the polishing operation is complete, the controller 3 calculates the correction amounts of the torque sensors based on the internal data recorded in the memory. Specifically, the controller 3 performs adjustment of the torque sensor.

Since the calculation processing for the correction amounts of the torque sensors is the same as the calculation processing of (1) and (2) of the first embodiment, description thereof has been omitted. Though each torque sensor correction amount is calculated as an average value obtained by averaging the correction amount obtained from the time-series data of the detected values of the torque sensor and force sensor over the entire polishing operation, it is not limited thereto, and in another embodiment, the correction amount obtained from the time-series data of the detected values of the torque sensor and the force sensor may be calculated as an average value averaged for each predetermined operation section during the polishing operation or for each predetermined time interval during the polishing operation.

Each calculated torque sensor correction amount is recorded in the memory of the controller 3 as internal data. As a result, the torque sensor adjustment (calibration process) is complete. At this time, the teaching device 4 switches the sensor adjustment mode 43 to "complete" on the force control settings screen 40 shown in FIG. 2B.

After adjusting the torque sensor, the force sensor 50 is removed from the machine 2. The removed force sensor 50 can be used on another machine. Specifically, the force sensor 50 may be used on another machine to perform force control, mass measurement, etc., and alternatively force control, mass measurement, etc., may be performed using the torque sensor after adjusting the torque sensor using the force sensor 50 as the external equipment on another machine.

The machine 2 uses the torque sensor to polish the side surface of another workpiece W1 in the next or subsequent operations, and the controller 3 performs force control with high precision by applying the adjustment results (correction amounts) of the torque sensors to the force acting on the control point P determined from the detected value of the torque sensor. Specifically, the controller 3 can execute force control with approximately the same accuracy as the force sensor 50.

Since the method of applying the torque sensor correction amount is the same as the calculation processing of (3) and (4) of the first embodiment, description thereof has been omitted. Though a single correction amount is applied throughout the entire polishing operation, the application of the correction amounts is not limited thereto, and in another embodiment, a single correction amount may be applied at each predetermined motion section during the polishing operation or at each predetermined time interval during the polishing operation.

Figure 6A:
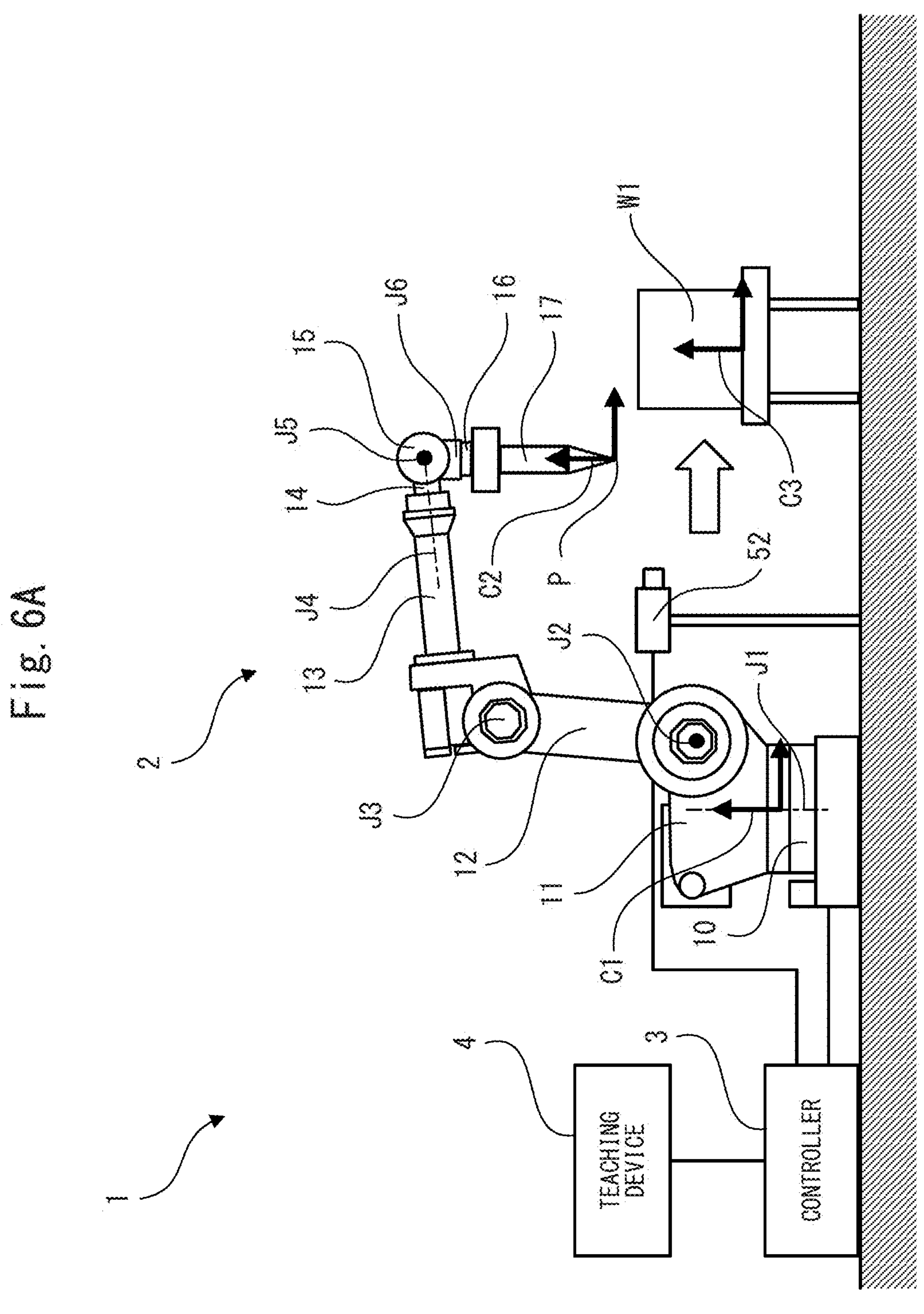
FIG. 6A is a configuration view of the machine system of a sixth embodiment.

The machine system 1 of a sixth embodiment will be described below. FIG. 6A is a configuration view of the machine system 1 according to the sixth embodiment. Though the configuration of the machine system 1 of the sixth embodiment is substantially the same as the configuration of the machine system 1 of the fifth embodiment, it differs from the fifth embodiment in that torque sensor adjustment (i.e., calibration processing) is performed using a visual sensor 52 as the external equipment in place of the force sensor 50. Furthermore, the machine 2 of the sixth embodiment differs from that of the fifth embodiment in that the machine 2 uses a deburring tool to remove burrs from a side surface of the workpiece W1.

When adjusting the torque sensor, the visual sensor 52 is installed near the control point P of the machine 2, for example, at a fixed position different from the machine 2. The controller 3 calculates the correction amounts of the torque sensors by acquiring a post-deburring image of the deburred portion of the workpiece W1 from the visual sensor 52, and comparing the actual deburring amount determined from a pre-deburring image and the post-deburring image with a target deburring amount. The controller 3 uses the calculated correction amount of the torque sensor to correct the force acting on the control point P of the machine 2 obtained from the detected value of the torque sensor, and performs force control, mass measurement, etc.

The visual sensor 52 is constituted by a three-dimensional visual sensor and acquires three-dimensional images. The actual deburring amount is calculated by subtracting the pre-deburring image and the post-deburring image. Further, the deburring target amount is recorded in the memory as internal data of the controller 3.

Figure 6B:
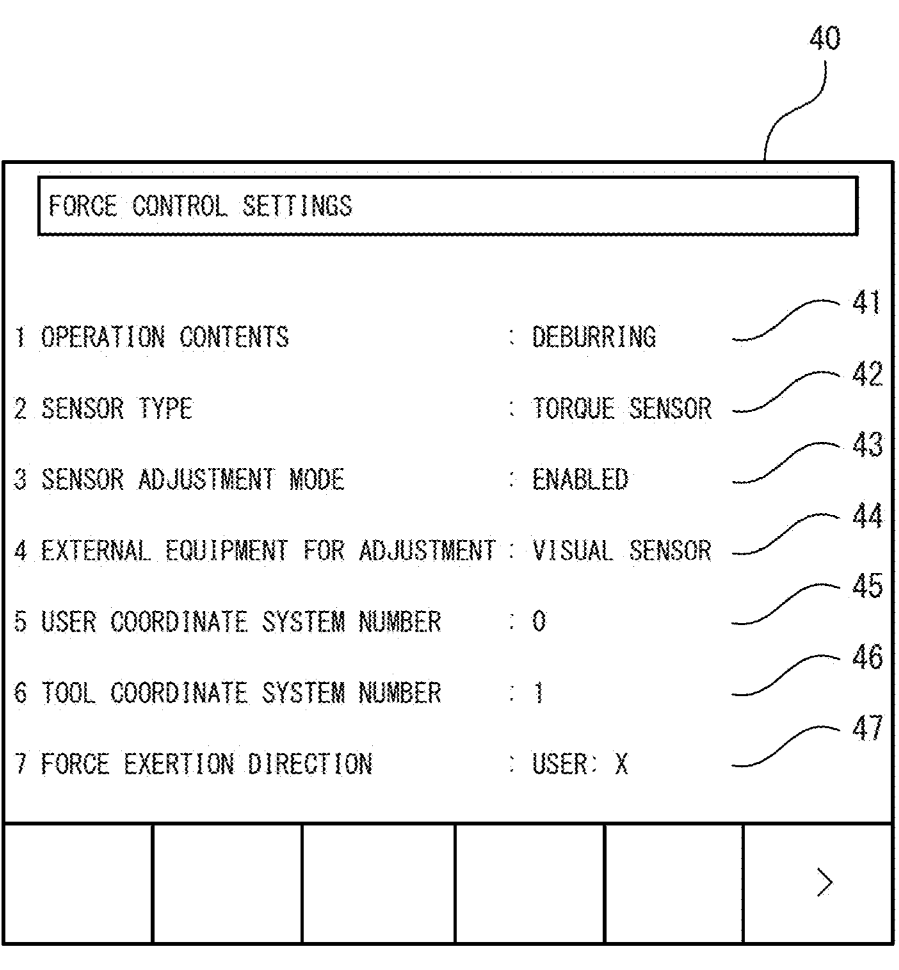
FIG. 6B shows a force control settings screen of the sixth embodiment.

When adjusting the torque sensor, the teaching device 4 is used to set parameters such as the operation contents of the machine 2, the sensor adjustment mode, and the external equipment used for adjusting the torque sensor. FIG. 6B shows the force control settings screen 40 of the sixth embodiment. In the sixth embodiment, since the machine 2 uses a deburring tool to deburr a side surface of workpiece W1, the operation contents 41 of the machine 2 is set to "deburring" on the force control settings screen 40.

Since the controller 3 uses the torque sensors to measure the force acting on the control point P of the machine 2, on the force control settings screen 40, the sensor type 42 used for force measurement is set to "torque sensor." Furthermore, when adjusting the torque sensor, the sensor adjustment mode 43 is set to "enabled" on the force control settings screen 40. While the sensor adjustment mode 43 is set to "enabled", the controller 3 executes torque sensor correction calculations. When torque sensor adjustment is complete, the sensor adjustment mode 43 is automatically set to "complete". Since it is difficult for the user to determine when the torque sensor adjustment is complete, and there is a risk that the user may forget to set sensor adjustment mode 43 to "complete", for example, when a predetermined number of repetitions of torque sensor adjustment have been performed or when the torque sensor adjustment result (correction amount) converges (when the torque sensor correction amount of each repetition becomes less than a predetermined threshold), the sensor adjustment mode 43 is preferably automatically set to "complete." Note that if torque sensor adjustment is not to be performed, the sensor adjustment mode 43 is preferably set to "disabled." In the sixth embodiment, since the visual sensor 52 is used as the external equipment used for adjusting the torque sensor, the external equipment 44 for adjustment is set to "visual sensor" on the force control settings screen 40.

Further, in the sixth embodiment, since the user coordinate system C3 in which the user coordinate system number is "0" and the tool coordinate system C2 in which the tool coordinate system number is "1" are used, on the force control settings screen 40, the user coordinate system number 45 is set to "0" and the tool coordinate system number 46 is set to "1". Further, in the sixth embodiment, since the force exertion direction when deburring the side surface of the workpiece W1 is the X-axis direction of user coordinate system C3, on the force control settings screen 40, the force exertion direction 47 is set to the "X" axis direction of the "user" coordinate system.

When force control setting is performed as described above, the machine 2 uses the visual sensor 52 to remove burrs from the side surface of workpiece W1, and the controller 3 records time-series data of images acquired from the visual sensor 52 from before the deburring operation to after the deburring operation in the memory as internal data. After the deburring operation is complete, the controller 3 calculates the correction amounts of the torque sensors based on the internal data recorded in the memory. Specifically, the controller 3 performs adjustment of the torque sensor.

An example of a method for calculating the correction amounts of the torque sensors will be described below. The calculation processing of the correction amounts of the torque sensors includes (1) calculation processing to calculate the actual deburring amount from the pre-deburring image and post-deburring image using the visual sensor 52, and (2) calculation processing to calculate the correction amounts of the torque sensors by comparing the actual deburring amount determined from the images of the visual sensor 52 and a target deburring amount recorded in advance in the memory. The correction amount C of the torque sensor is obtained, for example, from the following formula.

[Math 8]

$$C = 1 + \frac{(D - D')}{D} \quad \text{Formula 8}$$

C: torque sensor correction amount

D: target deburring amount

D': actual deburring amount determined from images from visual sensor

The correction amounts of the torque sensors are calculated as described above. Note that though the correction amount of each torque sensors is calculated as an average value obtained by averaging the correction amount obtained from time-series data of the images of the visual sensor 52 over the entire deburring operation, it is not limited thereto, and in another embodiment, the correction amount obtained from the time-series data of the images of the visual sensor 52 may be calculated as an average value averaged for each predetermined operation section during the deburring operation or for each predetermined time interval during the deburring operation.

Each calculated torque sensor correction amount is recorded in the memory of the controller 3 as internal data. As a result, the torque sensor adjustment (calibration process) is complete. At this time, the teaching device 4 switches the sensor adjustment mode 43 to "complete" on the force control settings screen 40 shown in FIG. 6B.

After adjusting the torque sensor, the visual sensor 52 is removed from the fixed position. The removed visual sensor 52 can be used on another machine. Specifically, force control, mass measurement, etc., may be performed using the visual sensor 52 on another machine, and alternatively, force control, mass measurement, etc., may be performed using the torque sensor after adjusting the torque sensor using the visual sensor 52 as the external equipment in another machine.

The machine 2 uses the torque sensors to remove burrs from the side surface of another workpiece W1 in the next and subsequent operations, and the controller 3 performs force control with high precision by applying the adjustment results (correction amounts) of the torque sensors to the force acting on the control point P determined from the detected value of the torque sensor. Specifically, the controller 3 can execute force control with approximately the same accuracy as the force sensor 50.

An example of the method for applying the torque sensor correction amount will be described below. The process for applying the torque sensor correction amount includes (3) calculation processing to convert the detected values of the torque sensors into a force acting on the control point P of the machine 2, and (4) calculation processing to apply the correction amounts of the torque sensors to the force acting on the control point P before correction obtained from the detected value of the torque sensor. Note that since the calculation processing of (3) is the same as the calculation processing of (1) of the first embodiment, description thereof has been omitted.

An example of the (4) calculation processing to apply the correction amounts of the torque sensors to the force acting on the control point P before correction obtained from the detected value of the torque sensor will be described. As expressed by the following formula, the value obtained by multiplying the force acting on the control point P before correction (force F1 in the force exertion direction in the present example) obtained from the detection values of the torque sensors by the correction amounts of the torque sensors (force correction amount C in the present example) is defined as the corrected force acting on the control point P (force F2 in the force exertion direction in the present example).

[Math 9]

$$F_2 = C \cdot F_1 \quad \text{Formula 9}$$

where:

$F_2$: corrected exertion direction force component acting on control point P determined from detected values of torque sensors $F_1$: uncorrected exertion direction force component acting on control point P determined from detected values of torque sensors C: torque sensor correction amount for one force component The torque sensor correction amount is applied as described above. Note that though a single correction amount is applied throughout the entire deburring operation, the application of the correction amounts is not limited thereto, and in another embodiment, a single correction amount may be applied at each predetermined motion section during the deburring operation or at each predetermined time interval during the deburring operation.

Furthermore, in the sixth embodiment, though the torque sensors are adjusted using images of the region where a deburring operation has been performed, in another embodiment, the torque sensors may be adjusted using images of a region where a polishing operation has been performed.

In the above embodiments, the torque sensors are adjusted in accordance with the operation contents (fitting operation, face alignment operation, phase alignment operation, screw fastening operation, constant force pressing operation, polishing operation, deburring operation) of the machine 2, and the results of the torque sensor adjustment (correction amounts) are applied in accordance with the operation contents of the machine 2. However, even if the operation contents are different, when the distances from the torque sensors to the control point P are substantially the same and the force exertion direction is substantially the same, the torque sensor adjustment results (correction amounts) can be applied to each other. For example, the correction amounts of the torque sensors obtained in a polishing operation may be applied to a deburring operation.

Figure 8:
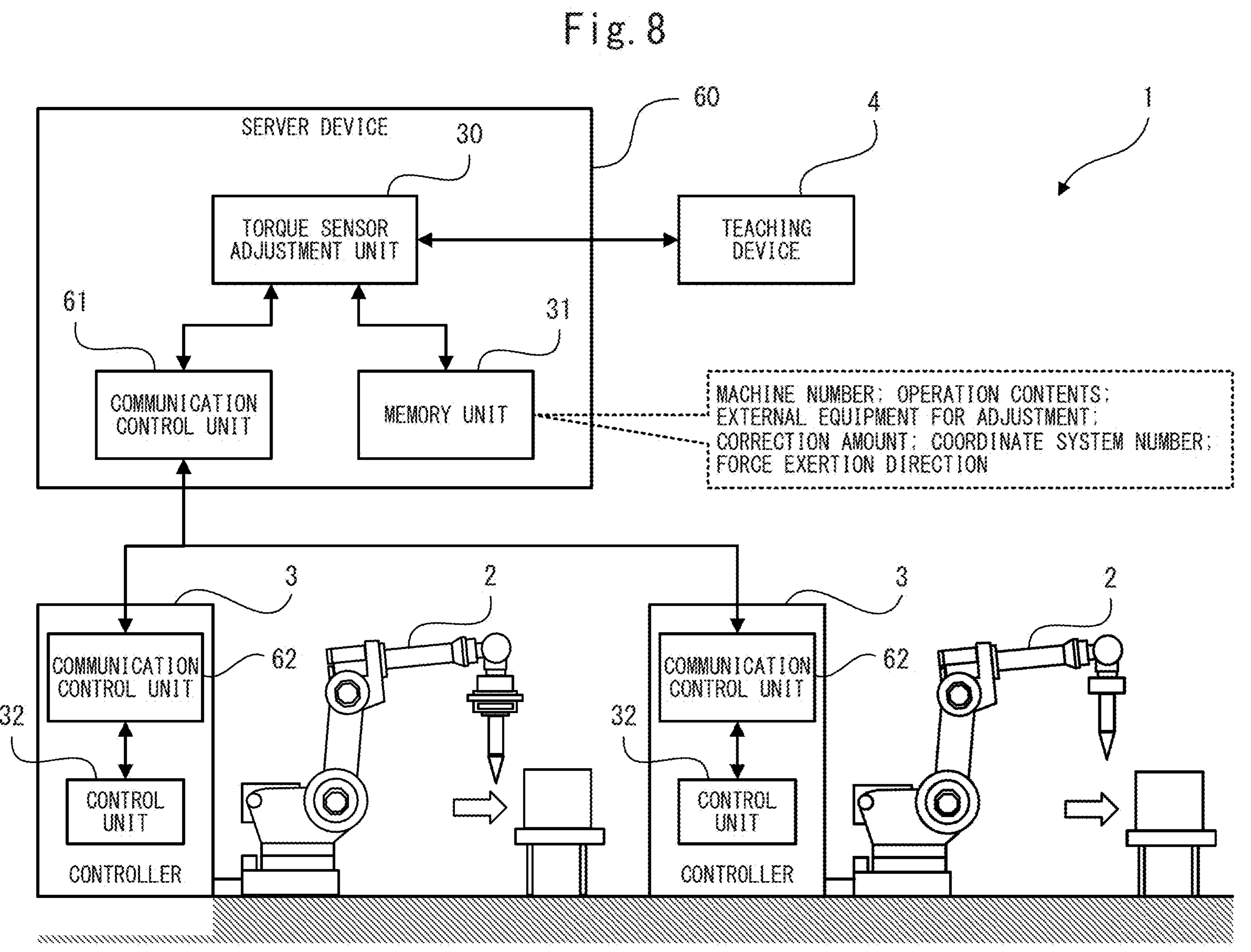
FIG. 8 is a block diagram of a machine system according to another embodiment.

The system configuration of the machine system 1 according to an embodiment will be described below. FIG. 7 is a block diagram of the machine system 1 according to an embodiment, and FIG. 8 is a block diagram of the machine system 1 according to another embodiment. The machine system 1 shown in FIG. 7 uses a standalone system that is not connected to a network such as a WAN (wide area network) or LAN (local area network), whereas the machine system 1 shown in FIG. 8 uses a client-server system connected to the network.

The machine system 1 shown in FIG. 7 comprises one machine 2 and one controller 3 for controlling the machine 2. The machine 2 comprises torque sensors 20 for detecting the torques acting on the links, and actuators 21 for driving the links. The controller 3 comprises a control unit 32 for performing force control or mass measurement using the torque sensors 20, and a torque sensor adjustment unit 30 for adjusting the torque sensors 20 using external equipment 5, which is any one of a force sensor 50, a workpiece 51 having a known mass, and a visual sensor 52, or using internal data recorded in the memory unit 31. Note that the torque sensor adjustment unit 30 performs all of the torque sensor adjustment functions described in the first to sixth embodiments. The torque sensor adjustment unit 30 adjusts the torque sensor 20 (calculates the correction amount) in accordance with the operation contents of the machine 2.

After adjusting the torque sensors 20, the torque sensor adjustment unit 30 records the adjustment results (correction amounts) of the torque sensors 20 in the memory unit 31 as internal data. Furthermore, the torque sensor adjustment unit 30 preferably automatically sets the adjustment of the torque sensor to complete when a predetermined number of repetitions of torque sensor adjustment have been performed or when the torque sensor adjustment result (correction amount) converges (when the torque sensor correction amount of each repetition becomes less than a predetermined threshold). After torque sensor adjustment is complete, the external equipment 5 is removed from the machine 2. In the next and subsequent operations on another workpiece, the torque sensor adjustment unit 30 applies the correction amounts of the torque sensors 20 to the force acting on the control point P determined from the detected value of the torque sensor 20, and the control unit 32 performs force control or mass measurement based on the corrected force acting on the control point P.

Note that as shown in the drawing, the memory unit 31 of the controller 3 records the operation contents of the machine 2, the external equipment 5 used for adjusting the torque sensors 20, the correction amounts of the torque sensors 20, the coordinate system number used, and the force exertion direction as internal data. Additionally, the memory unit 31 stores the enablement, disablement, or completion of adjustment of the torque sensor 20, time-series data of the torque sensor 20, time-series data of the external equipment 5, and various data such as mass and target removal amount as internal data.

The machine system 1 shown in FIG. 8 comprises a plurality of machines 2, a plurality of controllers 3 for respectively controlling the plurality of machines 2, and a server device 60 for connecting the plurality of controllers 3 via wire or wirelessly. The machines 2 are configured with the same specifications, and comprise torque sensors 20 for detecting the torques acting on the links, and actuators 21 for driving the links. The controller 3 comprises a control unit 32 for performing force control or mass measurement using the torque sensors 20, and a communication control unit 62 which can communicate with the server device 60 via wire or wirelessly.

The server device 60 comprises a communication control unit 61 which is capable of communicating with the controller 3 via wire or wirelessly, and a torque sensor adjustment unit 30 for adjusting the torque sensor 20 of each of the plurality of machines 2 using the external equipment 5 or using internal data or external data recorded in the memory unit 31. Note that the torque sensor adjustment unit 30 performs all of the torque sensor adjustment functions described in the first to sixth embodiments. The torque sensor adjustment unit 30 adjusts each torque sensor 20 in accordance with the operation contents of each of the plurality of machines 2.

After adjusting the torque sensor 20 of a specific machine 2, the torque sensor adjustment unit 30 records the adjustment results (correction amounts) of the torque sensors 20 in the memory unit 31 as internal data. Furthermore, the torque sensor adjustment unit 30 preferably automatically sets the adjustment of the torque sensor for the specific machine 2 to complete when a predetermined number of repetitions of torque sensor adjustment have been performed for the specific machine 2 or when the torque sensor adjustment result (correction amount) for the specific machine 2 converges (when the torque sensor correction amount of each repetition becomes less than a predetermined threshold). After the torque sensor adjustment for the specific machine 2 is complete, if the operation contents of the specific machine 2 are different from the operation contents of another machine 2, the external equipment 5 is removed from the specific machine 2 and attached to another machine 2, and the torque sensor adjustment unit 30 uses the external equipment 5 to adjust the torque sensor 20 of the other machine 2. If the operation contents of the specific machine 2 are the same or similar to the operation contents of the other machine 2, the torque sensor adjustment unit 30 adjusts the torque sensor 20 of the other machine 2 using the internal data recorded in the memory unit 31 for the specific machine 2 or external data recorded in the controller 3 of the specific machine 2.

The torque sensor adjustment unit 30 applies the correction amounts of the torque sensors 20 for each machine 2 to the force acting on the control point P obtained from the detected values of the torque sensors 20 for each machine 2 in the next and subsequent operations on another workpiece, and the control unit 32 performs force control or mass measurement based on the corrected force acting on the control point P.

Note that as shown in the drawing, the memory unit 31 of the server device 60 records the numbers of the machines 2, the operation contents of the machines 2, the external equipment 5 used for the adjustment of the torque sensors 20, the correction amounts of the torque sensors 20, the coordinate system numbers used, and the force exertion directions as internal data. Additionally, the memory unit 31 records the enablement, disablement, or completion of adjustment of the torque sensor 20, time-series data of the torque sensor 20, time-series data of the external equipment 5, various data such as the mass and target removal amount as internal data.

Though the torque sensor adjustment unit 30 is provided in the controller 3 or the server device 60 in the machine system 1 shown in FIG. 7 or 8, in yet another embodiment, the torque sensor adjustment unit 30 may be provided in the teaching device 4. It should be noted that the teaching device 4 may also function as the server device 60 described above.

According to the above embodiments, the force acting on the control point P of the machine 2 can be measured with high precision using the torque sensors 20 attached to the links of the machine 2.

Note that the memory unit 31 is composed of memory such as RAM (random access memory), ROM (read-only memory), and SSD (solid state drive). Though the torque sensor adjustment unit 30, control unit 32, and communication control units 61, 62 are constituted by processors such as a PLC (programmable logic controller), CPU (central processing unit), MPU (micro processing unit), FPGA (field programmable gate array), or ASIC (application specific integrated circuit), in another embodiment, the torque sensor adjustment unit 30, the control unit 32, and the communication control units 61, 62 may be constituted by programs executed by a processor.

The programs executed by the processors, drive circuits, etc., described above may be provided recorded on a computer-readable non-transitory storage medium such as a CD-ROM, or may be distributed and provided from a server device on a WAN (wide area network) or LAN (local area network) via wire or wirelessly.

Though various embodiments of the present invention have been described herein, the present invention is not limited to the embodiments described above, and it should be recognized that various changes can be made within the scope described in the claims.

| DESCRIPTION OF REFERENCE SIGNS | |
|---|---|
| 1 | machine system |
| 2 | machine |
| 3 | controller |
| 4 | teaching device |
| 5 | external equipment |
| 10 | link (base) |
| 11 | link (rotating trunk) |
| 12 | link (upper arm) |
| 13 | link (forearm) |
| 14 to 16 | link (wrist element) |
| 17 | tool |
| 20 | torque sensor |
| 21 | actuator |
| 30 | torque sensor adjustment unit |
| 31 | memory unit |
| 32 | control unit |
| 40 | force control settings screen |
| 41 | operation contents |
| 42 | sensor type |
| 43 | sensor adjustment mode |
| 44 | external equipment for adjustment |
| 45, 46 | coordinate system number |
| 47 | force exertion direction |
| 50 | force sensor |
| 51 | workpiece having known mass |
| 52 | visual sensor |
| 60 | server device |
| 61, 62 | communication control unit |
| C1 to C3 | coordinate system |
| J1 to J6 | axis |
| P | control point |
| W1, W2 | workpiece |

The invention claimed is:

1. A controller, comprising:

a control unit which performs force control or mass measurement using a torque sensor for detecting torque acting on a link of a machine, and a torque sensor adjustment unit for performing adjustment of the torque sensor using external equipment, wherein the external equipment is a workpiece having a known mass or a visual sensor.

2. The controller according to claim 1, wherein the torque sensor adjustment unit sets the adjustment of the torque sensor to complete when an adjustment of the torque sensor have been performed or when a result of the adjustment of the torque sensor has converged.

3. The controller according to claim 1, wherein the torque sensor adjustment unit uses results of the adjustment in force control or mass measurement of a workpiece different from the workpiece used during the adjustment.

4. The controller according to claim 1, wherein the torque sensor adjustment unit performs the adjustment of the torque sensor in accordance with operation contents of the machine.

5. The controller according to claim 4, wherein the operation contents comprise any one of a fitting operation, a face alignment operation, a phase alignment operation, a screw fastening operation, a constant force pressing operation, a polishing operation, and a deburring operation.

6. The controller according to claim 1, wherein the control unit uses a correction amount of the torque sensor in accordance with operation contents of the machine.

7. A controller, comprising:

a control unit which performs force control or mass measurement using a torque sensor for detecting torque acting on a link of a machine, and a torque sensor adjustment unit for performing adjustment of the torque sensor using external equipment;

wherein the torque sensor adjustment unit performs the adjustment of the torque sensor using an image of a location where at least one of a deburring operation and a polishing operation was performed, wherein the external equipment is a workpiece having a known mass or a visual sensor.

8. A machine system, comprising:

a machine comprising a torque sensor for detecting a torque acting on a link, a control unit which performs force control or mass measurement using the torque sensor, and a torque sensor adjustment unit which performs adjustment of the torque sensor using external equipment, wherein the external equipment is a workpiece having a known mass or a visual sensor.

* * * * *